March 27, 1928.  1,664,258

J. G. McNAMARA

TYPOGRAPHICAL MACHINE

Filed Sept. 25, 1925    19 Sheets-Sheet 1

INVENTOR
James McNamara
BY
ATTORNEYS

March 27, 1928.　　　　　　　　　　　　　　　　1,664,258
J. G. McNAMARA
TYPOGRAPHICAL MACHINE
Filed Sept. 25, 1925　　　19 Sheets-Sheet 2

INVENTOR
James McNamara
BY
Rogers, Kennedy & Campbell
ATTORNEYS

March 27, 1928. 1,664,258
J. G. McNAMARA
TYPOGRAPHICAL MACHINE
Filed Sept. 25, 1925 19 Sheets-Sheet 5

INVENTOR
James McNamara
BY
Rogers Kennedy Campbell
ATTORNEYS

March 27, 1928.

J. G. McNAMARA 1,664,258

TYPOGRAPHICAL MACHINE

Filed Sept. 25, 1925

INVENTOR
James McNamara
BY
Rogers, Kennedy & Campbell
ATTORNEYS.

March 27, 1928.
J. G. McNAMARA
1,664,258
TYPOGRAPHICAL MACHINE
Filed Sept. 25, 1925
19 Sheets-Sheet 7
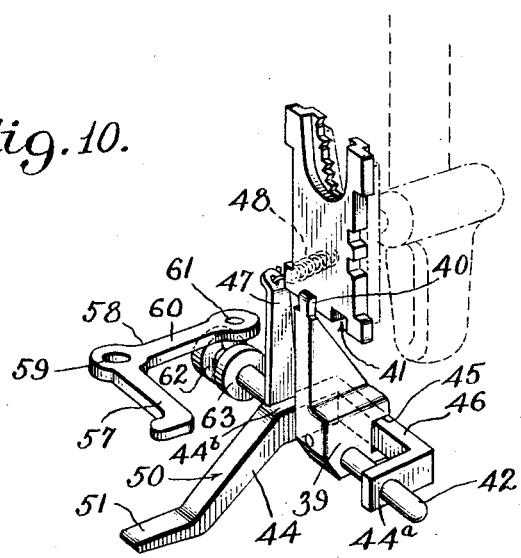
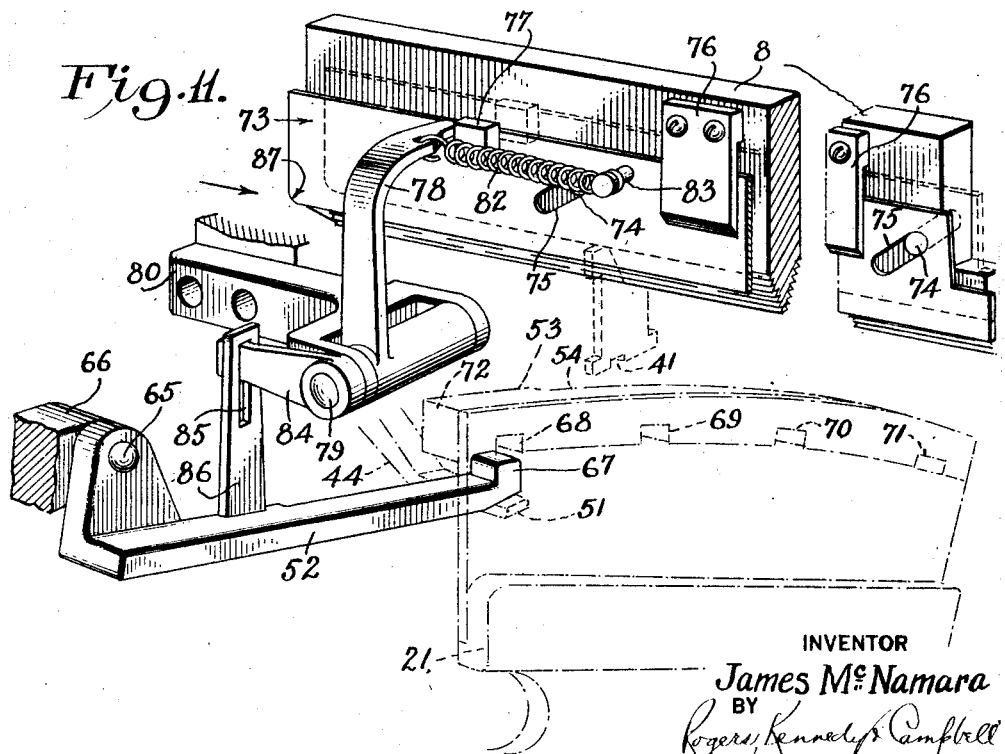
INVENTOR
James McNamara
BY
Rogers, Kennedy & Campbell
ATTORNEYS March 27, 1928.
J. G. McNAMARA
1,664,258
TYPOGRAPHICAL MACHINE
Filed Sept. 25, 1925
19 Sheets-Sheet 8
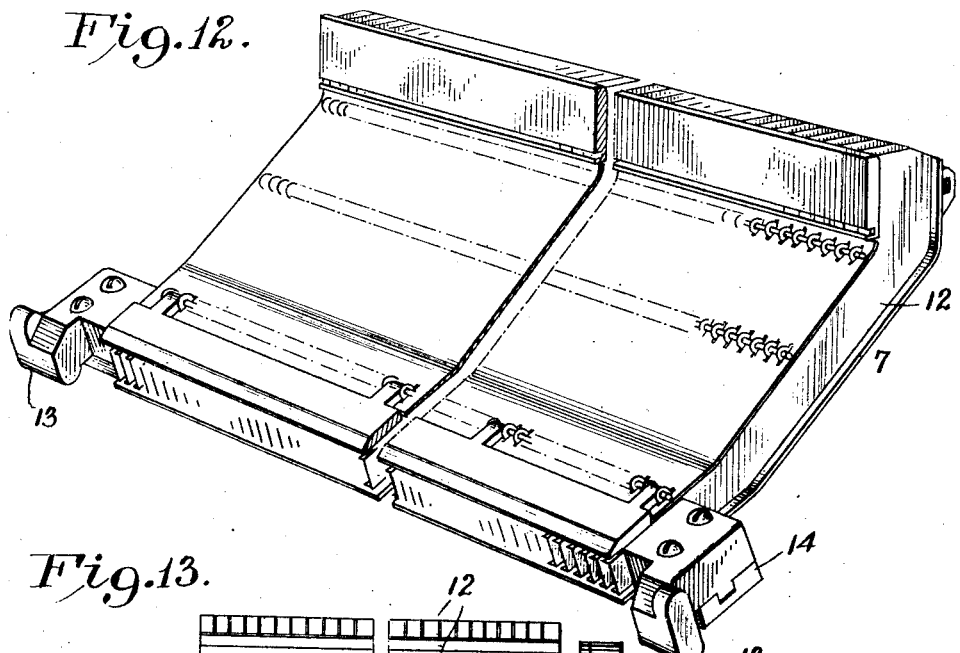
Fig.12.
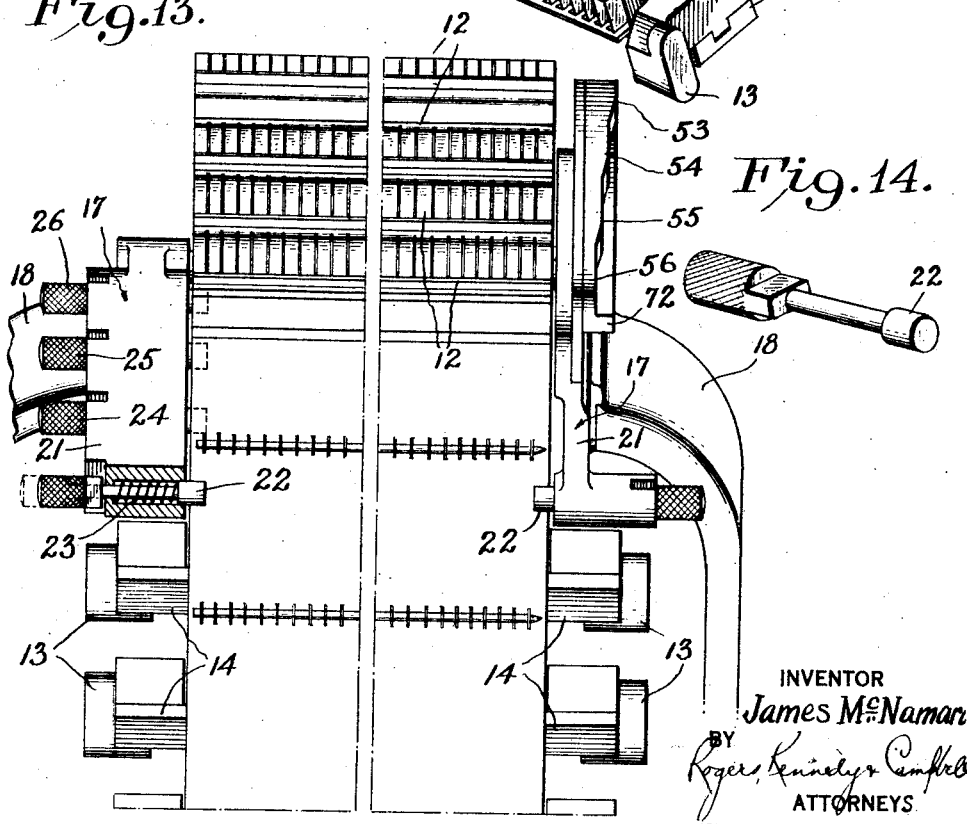
Fig.13.
Fig.14.
INVENTOR
James McNamara
BY
Roger, Kennedy & Campbell
ATTORNEYS

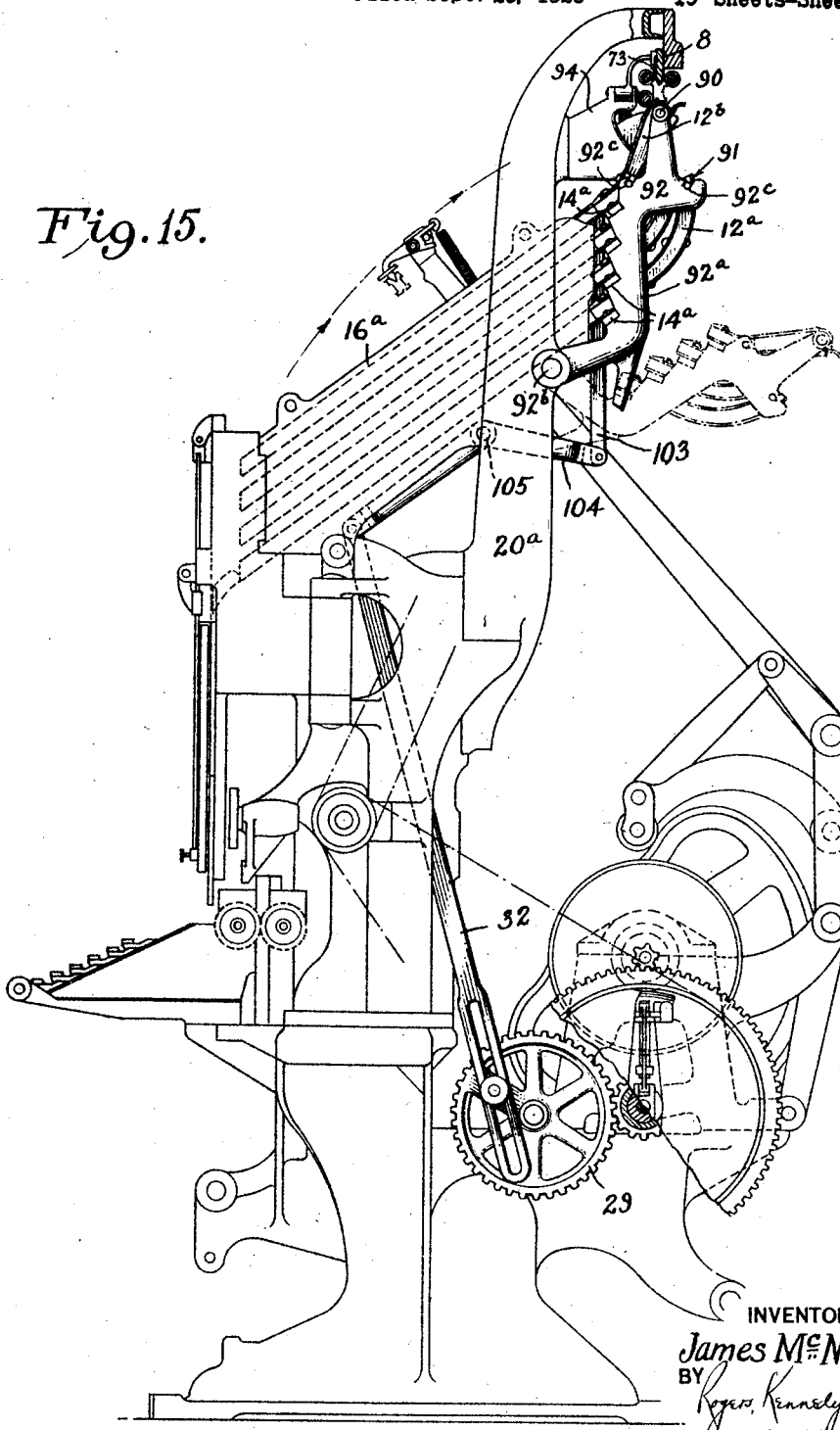

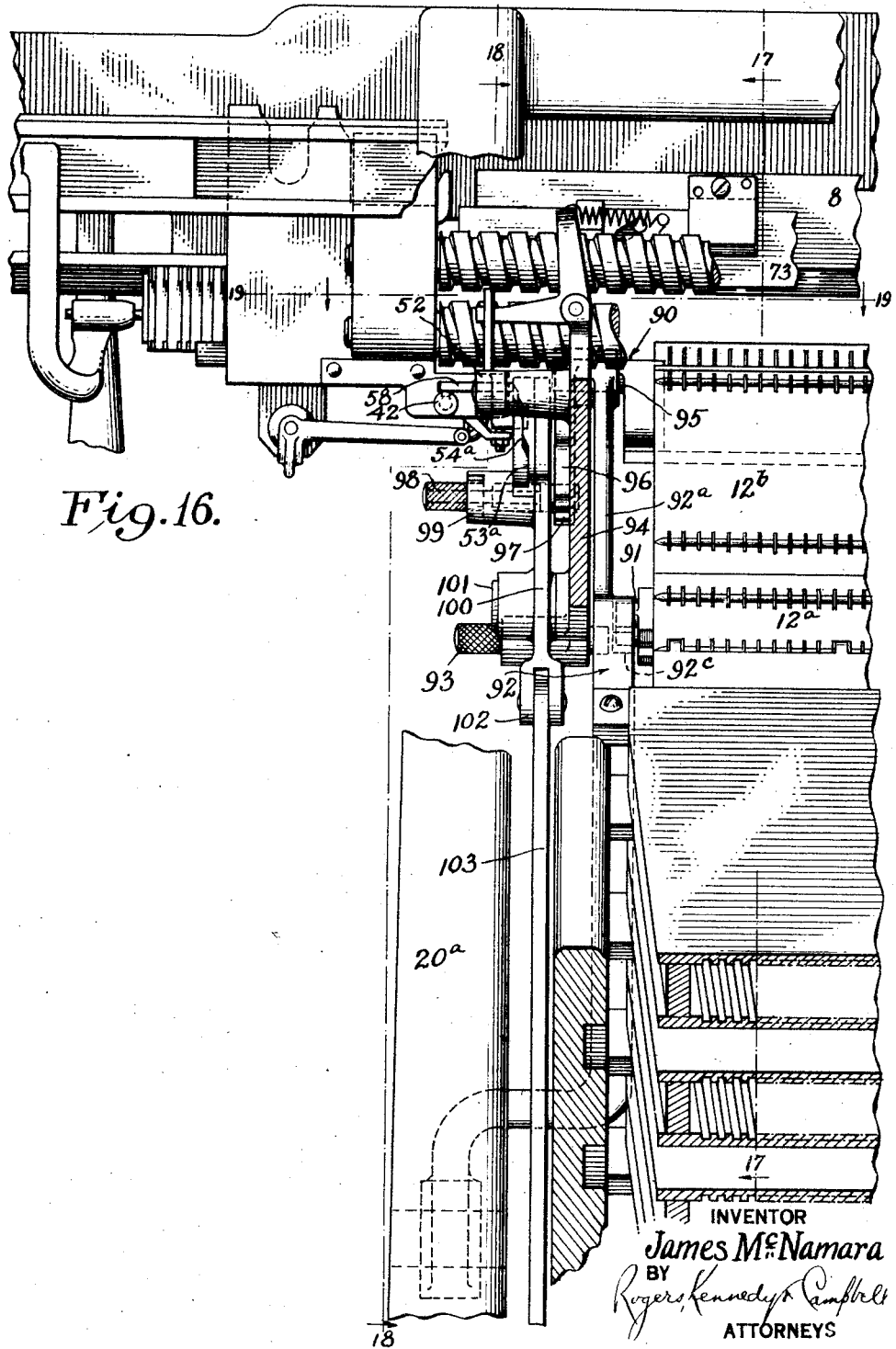

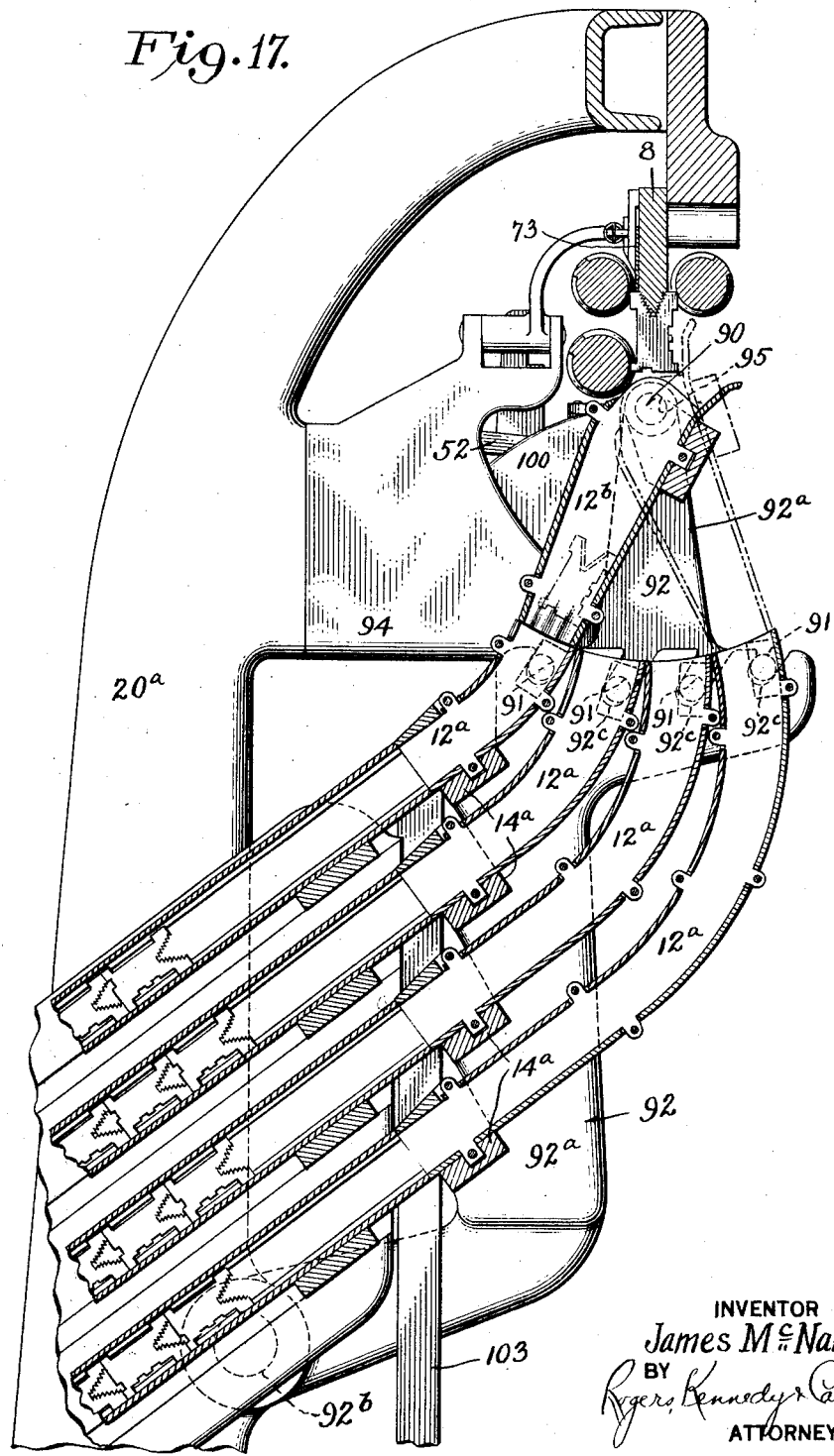

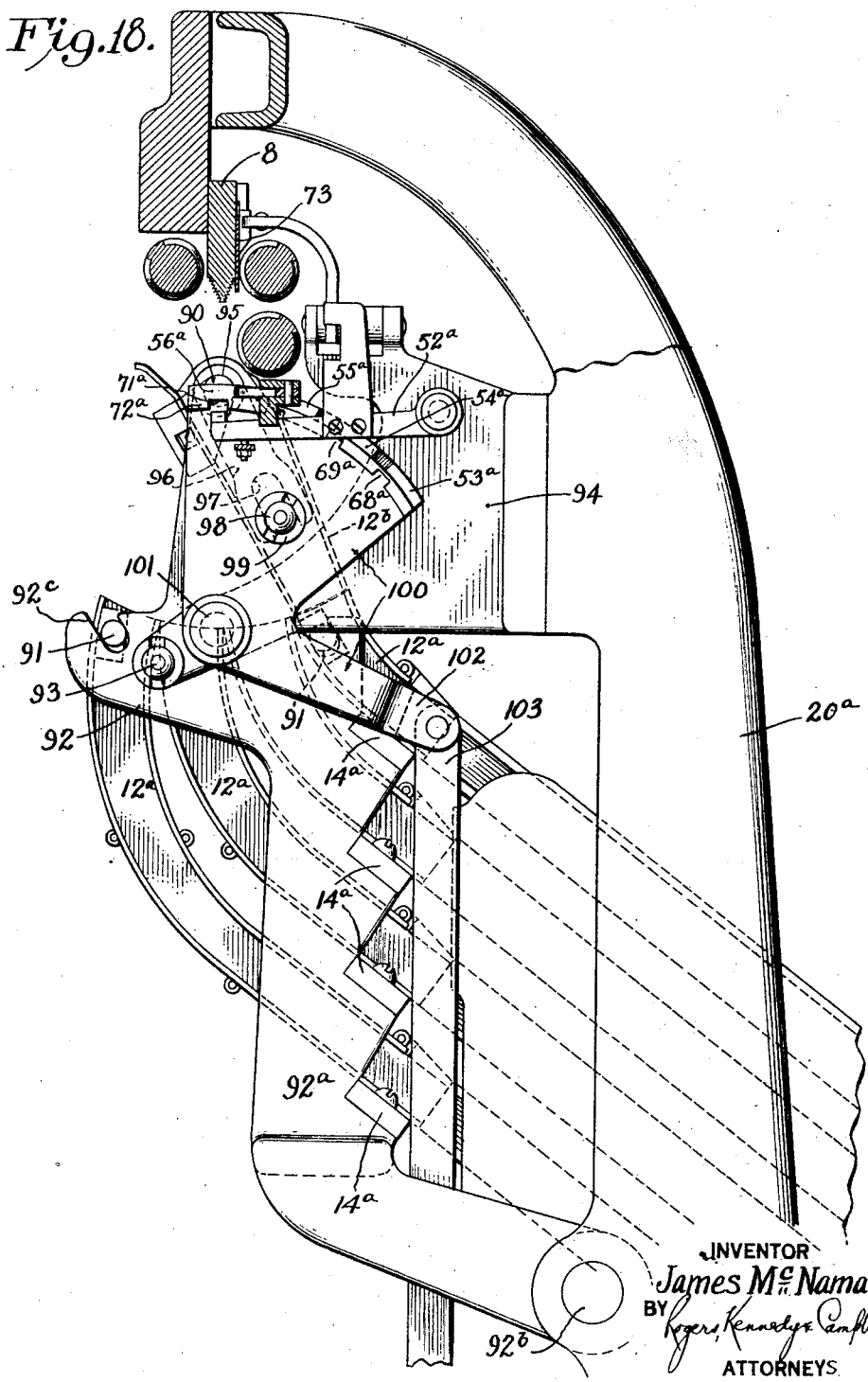

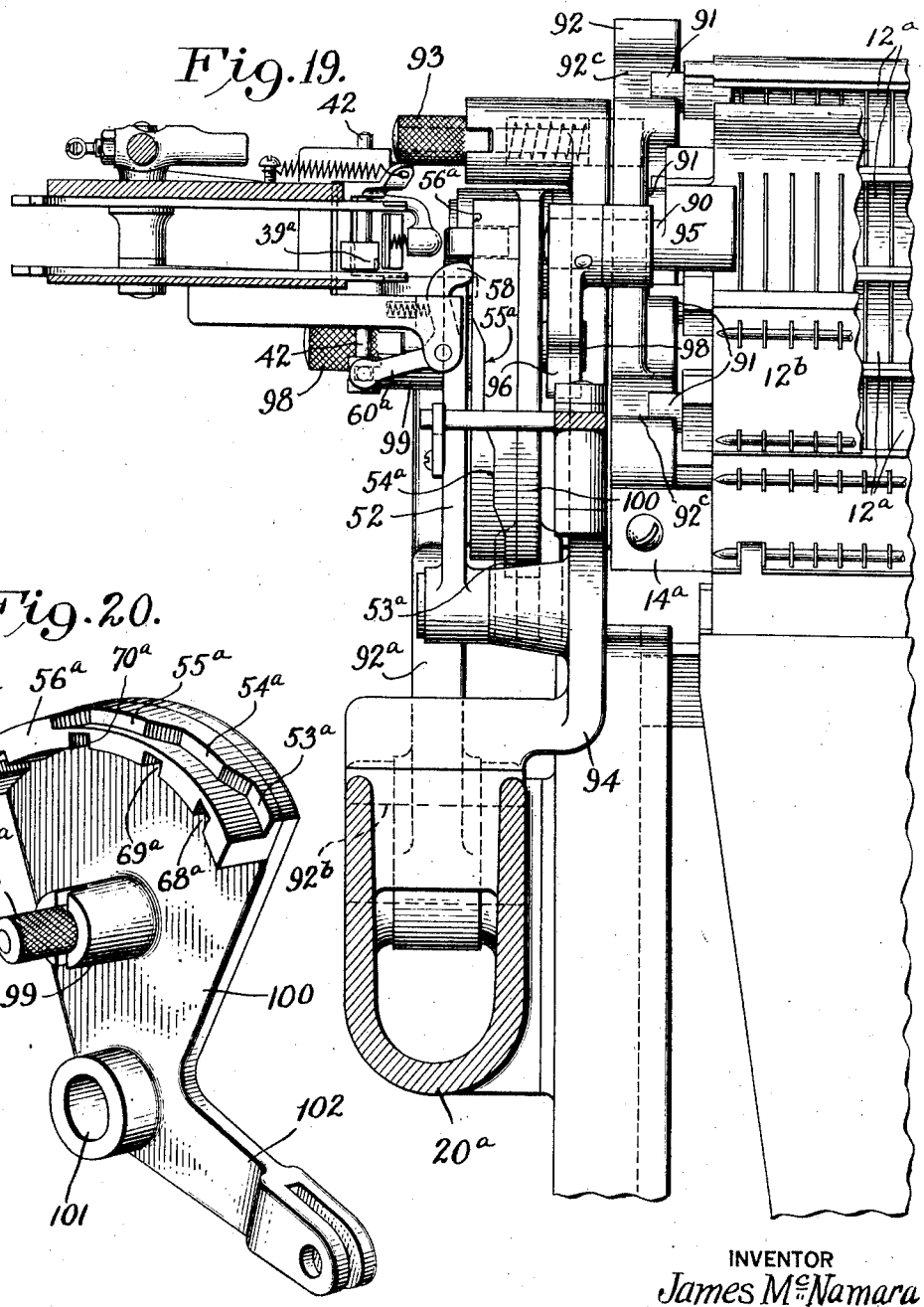

March 27, 1928.

J. G. McNAMARA

TYPOGRAPHICAL MACHINE

Filed Sept. 25, 1925

INVENTOR
James McNamara
BY
Rogers, Kennedy & Campbell
ATTORNEYS.

March 27, 1928.

J. G. McNAMARA 1,664,258

TYPOGRAPHICAL MACHINE

Filed Sept. 25, 1925   19 Sheets-Sheet 18

INVENTOR
James McNamara
BY
Rogers, Kennedy & Campbell
ATTORNEYS

March 27, 1928.   1,664,258
J. G. McNAMARA
TYPOGRAPHICAL MACHINE
Filed Sept. 25, 1925   19 Sheets-Sheet 19
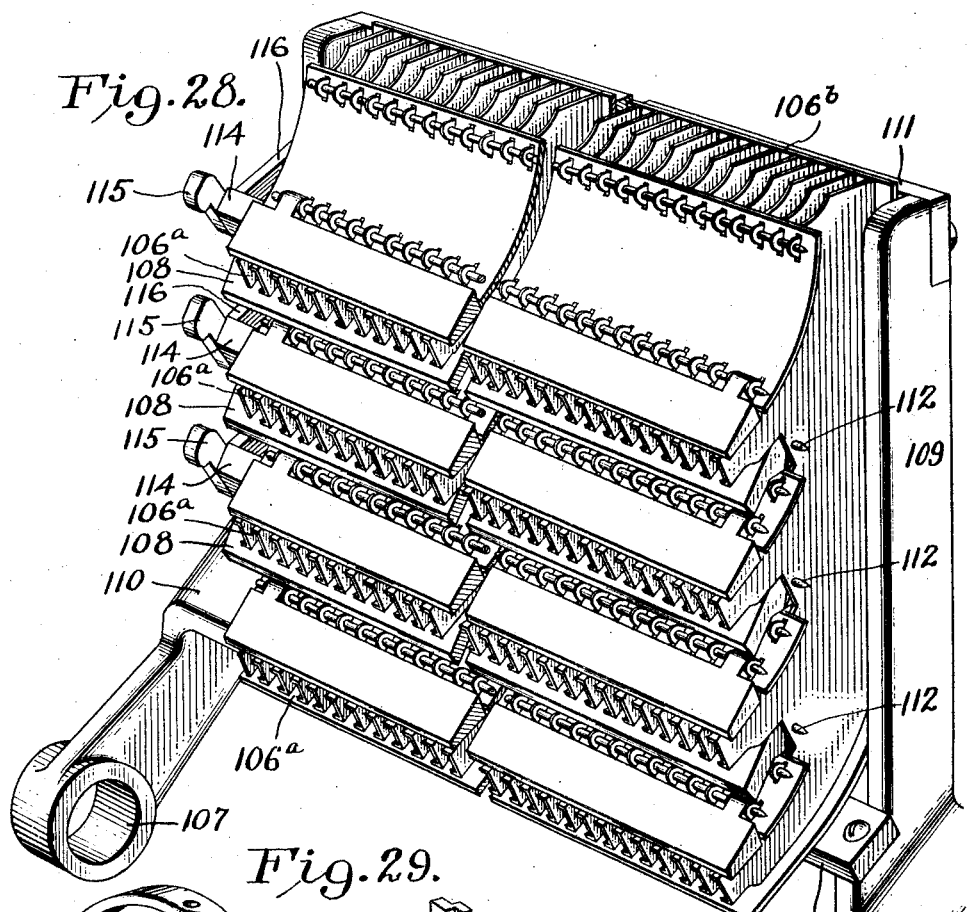
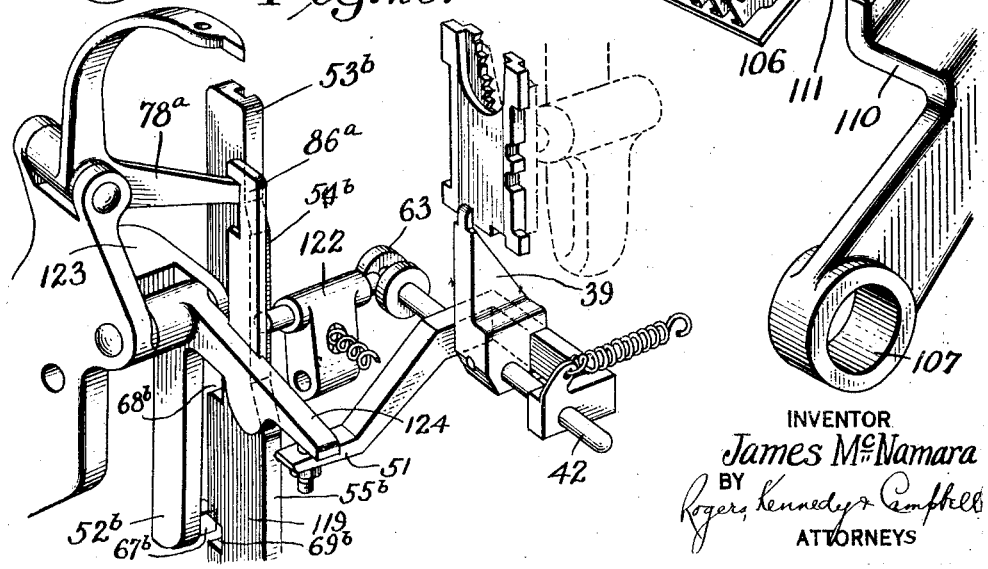
INVENTOR
James McNamara
BY
Rogers, Kennedy & Campbell
ATTORNEYS Patented Mar. 27, 1928.

1,664,258

UNITED STATES PATENT OFFICE.

JAMES G. McNAMARA, OF BROOKLYN, NEW YORK, ASSIGNOR TO MERGENTHALER LINOTYPE COMPANY, A CORPORATION OF NEW YORK.

TYPOGRAPHICAL MACHINE.

Application filed September 25, 1925. Serial No. 58,491.

This invention has reference to typographical machines, such as linotype machines of the general organization represented in Letters Patent of the United States No. 436,532 to O. Mergenthaler, wherein circulating matrices are released from a magazine in the order in which their characters are to appear in print, and then assembled in line, the composed line transferred to the face of a mold, the mold filled with molten metal to form a slug or linotype against the matrices which produce the type characters thereon, and the matrices thereafter elevated and returned through a distributing mechanism to the magazine from which they started. More particularly, the invention relates to machines equipped with a plurality of magazines containing matrices of different forms and any selected one of which may be brought into action at will, so that a line may be produced with faces represented by the matrices in any one magazine, or by a combination of faces represented by the matrices in two or more magazines. In certain machines of this type there are employed a single distributor, which first separates the matrices according to character irrespective of form or font, and a sorting mechanism which then sorts the matrices according to form or font and directs them into their appropriate magazines. The present invention is primarily directed to a distributing mechanism of this general class, and consists in an improved combination and arrangement of parts which will best be understood from the detailed description to follow.

In the accompanying drawings, the improvements have been shown merely in preferred form and by way of example, and obviously many changes and variations may be made therein and in their mode of application which will still be comprised within the spirit of the invention. It is to be understood therefore that the invention is not limited to any specific form or embodiment, except in so far as such limitations are specified in the claims.

Referring to the drawings:

Fig. 10 is a perspective view of the matrix feeler member of the matrix controlled mechanism, and certain parts associated therewith;

Fig. 11 is a perspective view of a portion of the distributor bar, the lock controlling plate thereon, and the parts operated by said plate for controlling the locking of the matrix directing means;

Fig. 12 is a perspective view of one of the channel entrance units detached;

Fig. 13 is a rear elevation of the channel entrance units and adjacent parts, and the adjacent portions of the supporting frame in which the units are mounted;

Fig. 14 is a perspective view of one of the retractable pins for detachably supporting the channel entrance units in their supporting frame;

Fig. 15 is a side elevation of a linotype machine having the invention embodied therein in an alternative form;

Fig. 16 is a view similar to Fig. 2, illustrating the alternative form of the invention;

Fig. 17 is a vertical longitudinal section taken on the line 17—17 of Fig. 16, showing the swinging channel entrance unit, in its relation to the stationary units;

Fig. 18 is a sectional elevation on the line 18—18 of Fig. 17;

Fig. 19 is a sectional plan view on the line 19—19 of Fig. 16;

Fig. 20 is a perspective view of a detail of the matrix directing means;

Fig. 28 is a detached perspective view of the channel entrance structure shown in Fig. 23; and Fig. 29 is a perspective view of certain parts of the matrix controlled mechanism for governing the adjustment of the matrix directing means.

Figure 1:
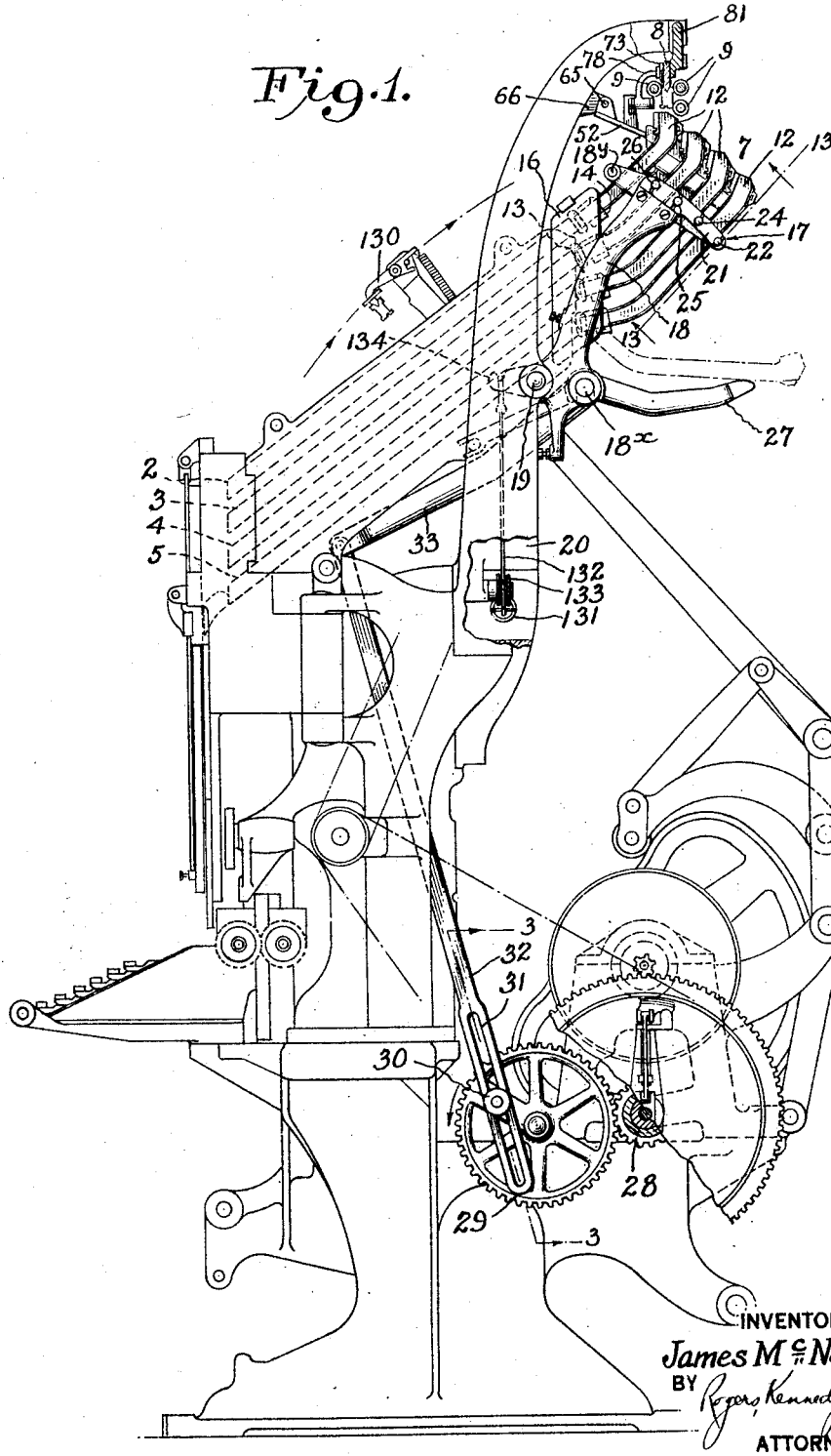
Fig. 1 is a side elevation of a linotype machine having the invention embodied therein in one form.
Figure 2:
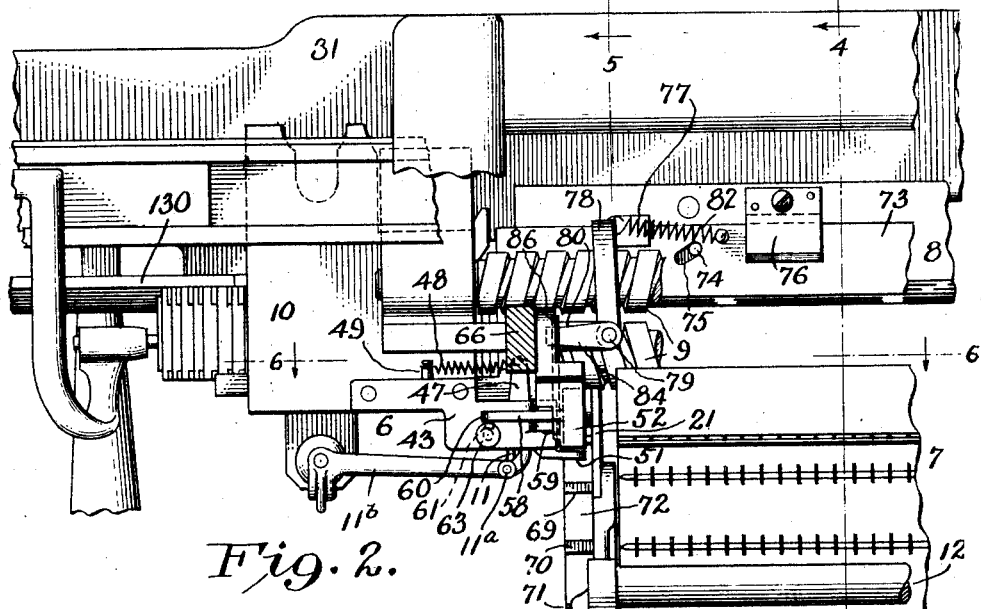
Fig. 2 is a front elevation on an enlarged scale of a portion of the machine, showing the distributor box, the improved matrix controlled mechanism associated therewith, and a portion of the magazines and channel entrances.

Referring first to the embodiment illustrated in Figs. 1 to 14, the matrices 1 are stored according to form or font in the four magazines 2, 3, 4 and 5, although a greater or less number may be employed. The matrices are released from their corresponding magazines and composed in line in the usual way, and are then presented to the casting mechanism for the production of the slug or linotype. After the casting operation, the matrices are carried upwardly by the second elevator 130 and delivered to a distributing mechanism 6, which first separates the matrices according to character and then delivers them to a matrix directing means 7, by which the matrices are separated according to form or font and directed into the appropriate channels of their respective magazines.

The distributing mechanism comprises, in the present instance, the usual ribbed or permuted distributor bar 8 and matrix conveying screws 9. The matrices are advanced toward the distributor through the usual distributor box 10 and are fed to the screws 9 by the ordinary lifting finger 11 pivoted at its lower end, as at $11^a$ to its operating lever $11^b$. By said screws 9, the matrices are moved onto the distributor bar 8 and advanced therealong in the regular way, all matrices bearing the same character dropping from the bar at a common point and thereafter distributed into the magazines according to form under the control of the matrix directing means 7, before mentioned.

The matrix directing means in the embodiment under discussion, consists of a number of channel entrance units 12, one for each magazine, which units are arranged one above another, with their lower ends in constant communication with the upper ends of the magazines, and which are adapted to be rocked as a group on their respective pivots to position the upper end of any selected one in operative relation to the distributor bar to receive the matrices as they are dropped therefrom. Each of the channel entrance units comprises as usual, upper and lower side plates and intermediate partition plates which divide the same into channels corresponding to those of the magazines. The pivotal mounting of the channel entrance units is preferably effected by providing each with fulcruming heads 13 fixed to the opposite projecting ends of a cross bar 14 extending along and fixed to the under side of the unit at its lower end, the upper and lower ends of said heads being rounded as shown in Fig. 12 to facilitate their rocking or fulcruming movement. These heads on the respective units are seated, so as to rock, in bearing sockets 15 formed in the side members of the magazine supporting frame 16, which sockets are open at the rear in order to permit of the independent removal and replacement of the channel entrance units as occasion may require. Above their pivots, the channel entrance units extend within and are carried by a reciprocating member in the form of a swinging supporting frame 17, which consists of two side arms 18 pivoted at their lower ends, as at 19, to the distributor brackets 20 on a horizontal transverse axis, and provided at their upper ends with cross heads 21, the side arms and heads being connected together to form a unitary frame structure by means of a lower transverse tie rod $18^x$ extending through the lower ends of the side arms, and an upper transverse tie rod $18^y$ extending through the upper ends of the heads. The lower unit of the group rests near its upper end at opposite sides on two horizontal retractable pins 22 mounted in the cross heads 21 at their lower ends, the said pins being acted on by springs 23 which hold them projected inwardly so as to give support to the lower unit as shown in Fig. 13. By this means, the unit may be released by the retraction of the pins and allowed to be separated from the units above as shown by dotted lines in Fig. 1, for inspection or repairs. The overlying units are supported in similar manner by retractable pins 24, 25, and 26 (Fig. 1), so that the various units of the whole group may be separated from each other at any point by retracting the proper supporting pins and swinging downwardly the released units. When swung downwardly, the units may be supported by a pair of supporting arms 27 projecting rearwardly from the tie rod $18^y$. Due to the form of mounting, the units may also be removed independently from the swinging supporting frame 17, when desired. It will now be seen that the channel entrance units above described constitute in effect an adjustable matrix directing means which may be adjusted by swinging the supporting frame 17 on its axis 19 and thereby setting the upper or receiving end of any selected one of the channel entrance units in operative relation to the distributor bar, so that the matrices released from said bar will be directed into one or another of the magazines according to the particular channel entrance which for the time being is in operative relation to the bar.

Figure 3:
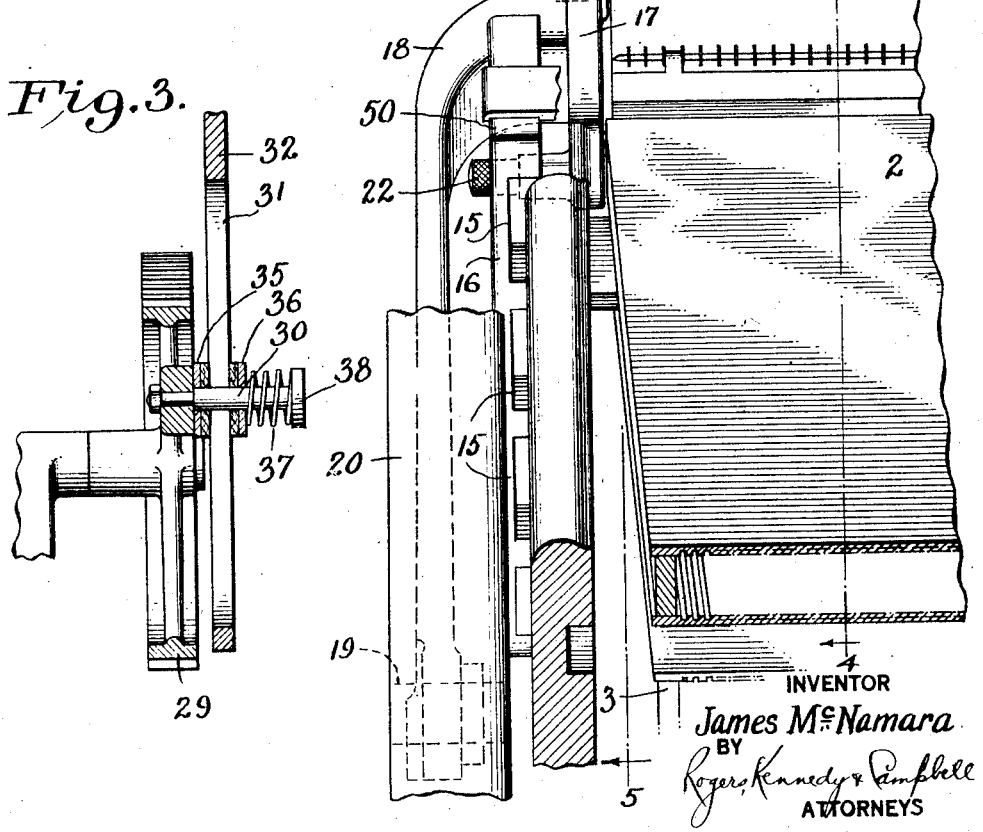
Fig. 3 is a sectional elevation on the line 3—3 of Fig. 1, showing how the member, which transmits power from the continuously operated power device to the matrix directing means, is frictionally engaged with said power device.

The means for effecting the required adjustment of the channel entrance units will now be described. Referring to Figs. 1 and 3, the motor shaft of the machine is provided with a driving pinion 28 which meshes with a larger pinion 29 and imparts a constant rotation to the same. The pinion 29 has fixed to it a crank pin 30 which extends loosely through a slot 31 in the lower end of a link 32 whose upper end is pivoted to the forward end of an arm 33. This arm 33 has its rear end fixed rigidly to the tie rod $18^x$ of the entrance frame 17, so that when the link 32 is reciprocated endwise by the rotation of the pinion 29, the frame 17 will be rocked on its pivotal axis and will adjust the channel entrance units in relation to the distributor bar. The channel entrance units are adapted, as will be presently described in detail, to be locked in one of their adjusted positions to locate a selected channel entrance in operative relation to the distributor bar, and they are also adapted to be released at times to permit their adjustment to another position to locate a different entrance in such operative relation. In order that the constantly rotating pinion 29 will be permitted to rotate while the entrance units are locked and to act in adjusting the units when unlocked, the connection between the crank pin 30 and the link 32 is made yielding or frictional (see Fig. 3) as by means of inner and outer friction washers 35 and 36 surrounding the crank pin 30 and bearing on opposite sides of the slotted portion of the link 32, a spiral spring 37 being applied to the pin and bearing at its inner end against the washer 36 and at its outer end against a head 38 on the end of the pin and operating to create frictional resistance to the movement of the pin in the slot. When the channel entrance units are locked in position, the crank pin in the rotation of the pinion will move back and forth in the slot and the link will be rocked idly back and forth on its pivotal connection with the arm 33, but when the parts are unlocked, the frictional resistance to the movement of the crank pin in the slot will be such as to cause the pin to move the link bodily endwise and thereby adjust the channel entrance units accordingly. To assist in their adjustment, the swinging parts are counterbalanced by a spring 131 (Fig. 1) which is connected to the frame 17 by means of a cord 132 passing over a pulley 133 and pulling downwardly on an arm 134 projecting forwardly from the side arms 18 of the frame.

Figure 7:
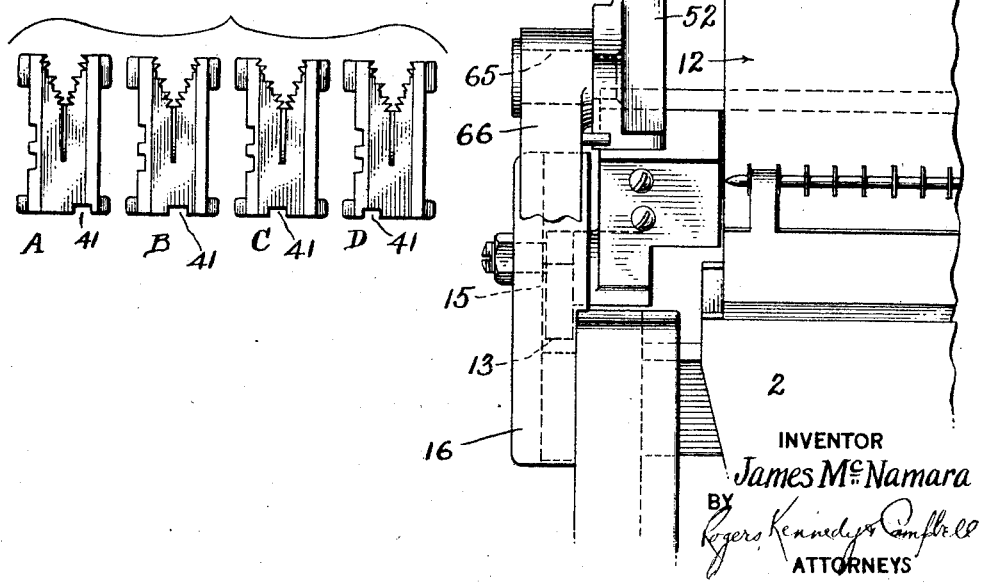
Fig. 7 is a face view of a group of matrices showing the different locations of the font distinguishing notches therein.
Figure 8:
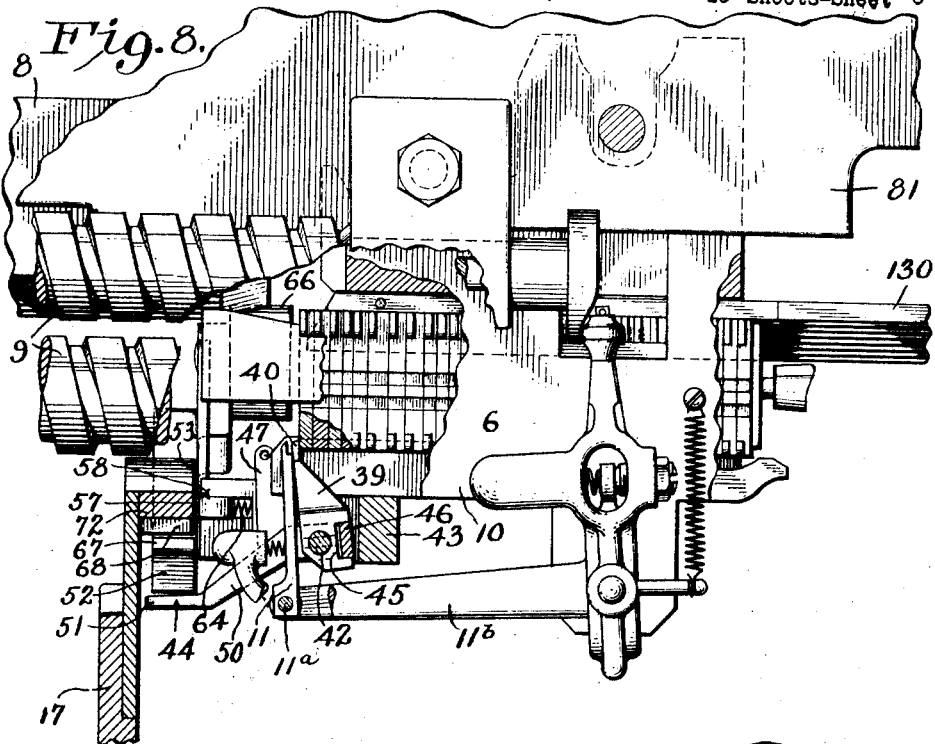
Fig. 8 is a rear elevation, on an enlarged scale, of the parts shown in Fig. 2, with portions broken away to better illustrate the construction.

The matrix controlled mechanism, before alluded to, for governing the adjustment of the channel entrances by the power devices just described, is best illustrated in Figs. 2 and 5 to 11 and will next be described. As shown in Fig. 7, the matrices are each provided at their lower edges with a notch 41 which, in the different fonts, is placed at different points edgewise of the matrix, there being in this instance four different positions of the notches corresponding to the four different fonts A, B, C, D, of matrices. Arranged in the path of the matrices at the delivery end of the distributor box 10, there is a feeler 39 presenting at its upper end a projection 40 which, when the feeler is in a vertical position, slightly overlaps the lower edges of the matrices as they are advanced through the distributor box. The feeler 39 is so mounted that it may rock forwardly facewise of the matrices in the direction of the feed and may also move edgewise of the matrices in a transverse direction. When the feeler projection 40 is in registry with a notch 41 in a matrix, the latter will be allowed to pass by the feeler and be fed to the distributor bar by the lifting finger 11 (Fig. 9), but when said projection is out of registry with the notch, the feeler will be engaged by the lower edge of the matrix and will, in the advance of the matrix, be pushed ahead of it in the direction of feed, rocking the lifting finger on its pivotal axis and rendering it inactive (Fig. 8). This forward movement of the feeler is also utilized to throw into action other devices forming part of the mechanism governing the adjustment of the channel entrance units, which devices during such adjustment move the feeler edgewise of the actuating matrix until its projection registers with the notch in the lower edge of said matrices. As a result, when a matrix is presented to the feeler differing in form from those which have already passed by, it will cause the channel entrance units to be adjusted to a new position corresponding to the different form of the matrix presented.

In providing for these movements of the feeler 39, it is fixed at its lower end to a horizontal rock shaft 42 mounted to turn in bearings in a bracket 43 fixed to the underside of the distributor box. The rock shaft is slidable endwise in its bearings and gives support to a U-shaped frame 44 (see particularly Figs. 6 and 10) whose side members 44a, 44b are rotatably mounted on the shaft and whose cross member 46 slidably engages in an open slot 45 formed in the lower end of the feeler at the rear. According to this arrangement of the parts, when the feeler is displaced forwardly by the matrices as above described, it will turn the shaft 42 in its bearings as an axis and rock the U-shaped frame 44 about the same axis, and when the feeler is moved edgewise of the matrices by the endwise movement of the shaft, it will slide along relatively to the U-shaped frame. The side member 44b of the U-shaped frame has fixed to it an upwardly extending arm 47 which is connected to a tension spring 48 anchored to a pin 49 on the bracket 43, which spring tends to hold the feeler finger yieldingly in a substantially vertical position, as shown in Fig. 10, with the projection 40 in the path of the matrices as they emerge from the distributor box. The side member 44b also has fixed to it a downwardly extending arm 50 which terminates in a horizontal finger 51 underlying a locking lever 52, by which the channel entrance units are locked in different positions of adjustment as will be presently described.

Figure 4:
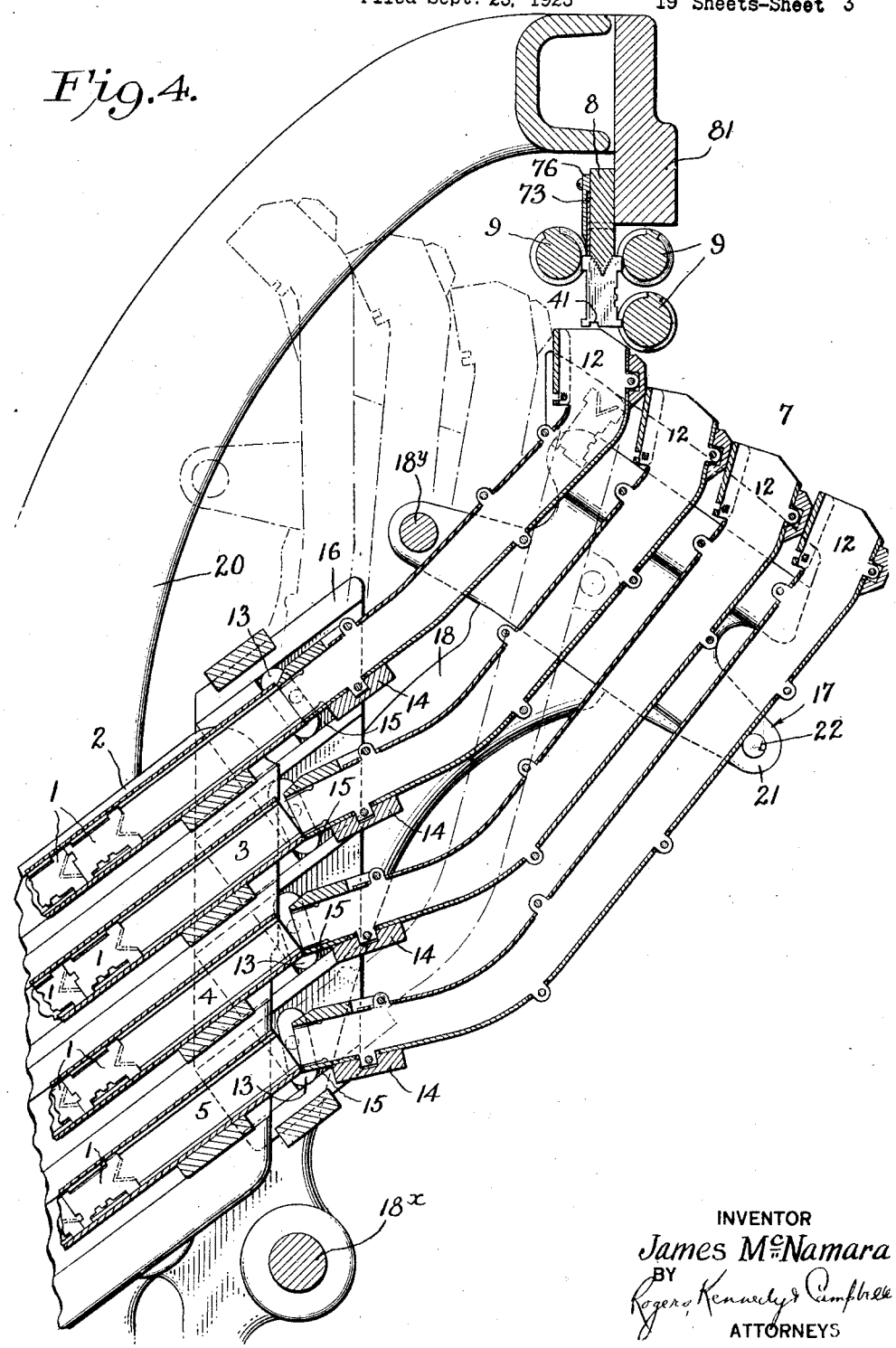
Fig. 4 is a vertical longitudinal section on the line 4—4 of Fig. 2, showing the upper part of the matrix magazines, the channel entrances, the distributor bar, and associated parts.

The edgewise movement of the feeler 39, in exploring the lower edges of the matrices, is effected automatically by the adjustment of the channel entrance units. To produce this action, four stepped cam surfaces 53, 54, 55 and 56 (Figs. 6 and 13) are provided on the outer face of one of the cross heads 21 of the channel entrance frame 17, in such position that when the frame is rocked to and fro in adjusting the channel entrance units, the cam surfaces will engage one arm 57 of the elbow lever 58 pivoted on a vertical axis 59 to the bracket 43 and whose other arm 60 is provided with a pin 61 engaging in a peripheral groove 62 formed in a collar 63 fixed to the end of the rock shaft 42 before alluded to. From this it will be seen that, as the frame 17 is swung by the power devices before described the cam surfaces will rock the elbow lever on its axis and thereby shift the rock shaft endwise to move the feeler edgewise of the matrices in the required manner. The arm 57 of the elbow lever is held yieldingly against the cam surfaces by means of a compression spring 64 seated in the bracket 43, see Fig. 6, and bearing against the arm. The relative form and construction of these parts is such that when the elbow lever is engaged by one of the cam surfaces, say the cam surface 53, the rock shaft 42 will be shifted to locate the feeler 39 in position to register with the notch 41 of the corresponding matrix (in this example a matrix A), and in that position of the frame 17, the particular channel entrance unit leading to the uppermost magazine 2 (in which the matrices A belong) will have its upper receiving end set in operative relation to the distributor bar, as shown in Fig. 4. By way of further example, when the elbow lever is engaged by the cam surface 56, the shaft 42 will locate the feeler 39 in position to register with the notch 41 in a matrix D, and the frame 17 in this position will hold the channel entrance unit leading to the corresponding magazine 5 in operative relation to the distributor bar (see dotted line showing in Fig. 4). The same is true in respect to the engagement of the cam surfaces 54 and 55 with the elbow lever, these cam surfaces determining the selection of the channel entrances which lead to the magazines 3 and 4 containing the matrices B and C, respectively.

Figure 5:
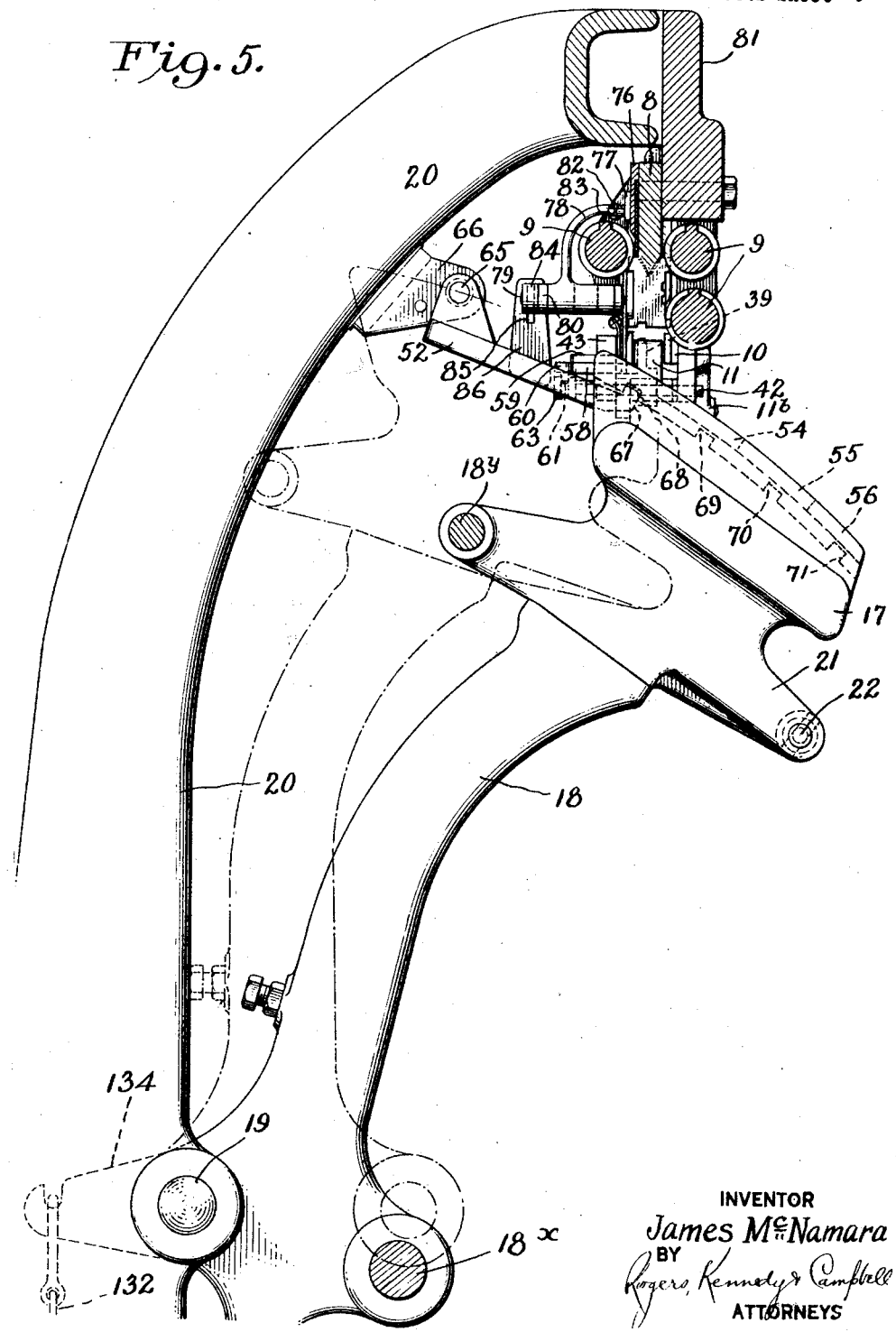
Fig. 5 is a sectional view taken on the line 5—5 of Fig. 2, showing in elevation the swinging frame carrying the channel entrances.
Figure 6:
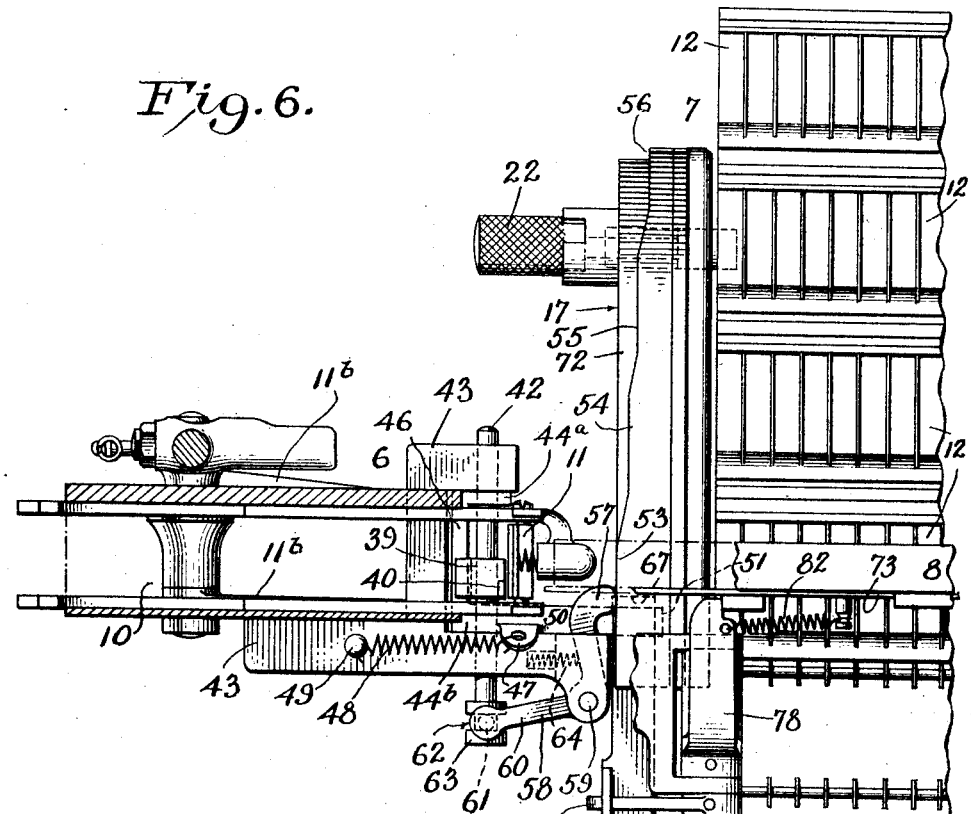
Fig. 6 is a sectional plan view taken on the line 6—6 of Fig. 2, showing the interior of the distributor box, and the relation of the matrix controlled mechanism thereto.

The entrance frame 17 is locked in its different adjusted positions by means of the locking lever 52, before alluded to, and which, as shown in Figs. 5 and 11, is pivoted as at 65 to a bracket 66 carried by the distributor bracket 20. At its free end, the lever 52 has a nose 67 adapted to engage in any one of a series of four notches 68, 69, 70 and 71 formed in the underside of a flange 72 projecting inwardly from the head 21 of the entrance frame, the topmost channel entrance being locked in operative relation to the distributor bar when the nose of the locking lever is engaged in the notch 68 so as to direct matrices of the font A into their magazine 2, and the channel entrances for the magazines 3, 4 and 5 being locked in operative relation to the distributor bar when the nose of the locking lever is engaged in the other notches 69, 70 and 71, respectively. As before mentioned, the engagement of the locking lever 52 with these different notches is controlled by the feeler 39 through the medium of the finger 51, the relation to these parts being such that when the feeler occupies a vertical position with its projection 40 in registration with the notch 41 of a matrix (as in Fig. 9) the locking lever is lifted up by the feeler spring 47 and its nose 67 caused to engage with the corresponding notch in the flange 72 so as to arrest and hold the entrance frame in the required adjusted position; whereas, when the feeler occupies an inclined or displaced position (as in Fig. 8) due to lack of registration of the projection 40 with a matrix notch 41, the locking lever is allowed to drop and disengage its nose from the flange 72 owing to the depression of the feeler finger 51 caused by the displacement of the feeler against the action of the spring 47, so as to release the entrance frame and permit it to be adjusted to another position. In this connection, it may be stated that the parts are so timed that the locking lever is raised by the spring 48 to engage in the active notch of the flange 72 slightly in advance of the arrival of said notch in locking position, being snapped into the notch at that time.

In addition to the control of the locking lever 52 by the feeler 39, as just described, it is also subject to the control of matrices undergoing distribution, the idea being to prevent the disengagement of the locking lever so long as there are any matrices on the distributor bar, even though the feeler may have been actuated to disengage the lever by the advance of a matrix differing in form from those undergoing distribution. The purpose of this final control of the locking lever is to insure that all of the matrices of a given form or font undergoing distribution are delivered from the distributor bar before the entrance frame is again adjusted, so as thus to guard against a mixture of different fonts in one magazine. This final control of the locking lever (Figs. 2, 5, 6, 10 and 11) is, in the present instance, effected by means of a feeler plate 73 connected to the distributor bar 8 by inclined pin and slot connections 74, 75 and guide cleats 76, whereby the plate is movable up and down on the bar in an oblique path, see particularly Figs. 2 and 10. The plate 73 is arranged in such relation to the toothed portion of the distributor bar that when a matrix or matrices are on the bar, the upper ends of their projecting ears will engage the lower edge of the plate and hold the latter in raised position, as shown by dotted lines in Fig. 11. When no matrices are on the bar, the plate will fall by gravity and occupy its lower position, as shown by the full lines in Fig. 11. A lug 77 is located on the plate 73 in position to engage the free end of a lever arm 78 extending upwardly from a rock shaft 79 mounted in bearings in a bracket 80 fixed to the distributor beam 81, the said lever arm being connected by a light tension spring 82 to a pin 83 on the plate, and acting to maintain the lug 77 in yielding engagement with the lever arm. Fast to the rock shaft 79 is a second arm 84 engaged at its end in a vertical slot 85 formed in a post 86 fixed to and extending upwardly from the locking lever 52 at a point between its ends. The matrices are fed to the distributor bar from the left in Figs. 2 and 11, and in order that the end of the plate 73 will not interfere with the passage of the matrices onto the bar, the lower corner of the plate is rounded as at 87, Fig. 11, so that the matrices will ride thereunder and lift the plate as the tooth combinations of the matrices become engaged with the bar. When thus lifted by the matrices, the plate is also shifted longitudinally toward the right, causing the spring 82 to pull on the lever arm 78 and rock the arm 84 upwardly to hold the locking lever 52 in active position, which it will probably have already assumed under the influence of the feeler 39. When now all of the matrices are released form the distributor bar but not until then, the plate will drop back by gravity to its lower position, moving endwise toward the left and causing the lug 77 to engage the lever arm 78 and rock the arm 84 downwardly to allow the locking lever 52 to fall by its own weight into inactive position if and when permitted by the feeler 39.

It will be understood from what has before been said that the unlocking action of the lever 52 cannot take place as long as the feeler 39 is in a vertical position, since in this position, as before explained, the finger 51 will underlie the end of the lever and prevent it from swinging down to unlocking position. Due to this cooperation of the feeler finger with the locking lever, and due to the final control of the latter by the feeler plate on the distributor bar, it can be seen that in the event that during the distribution of matrices of a given form, a matrix of different form is presented to the feeler 39, the latter will be actuated in the manner before described to prevent the feed of said matrix to the distributor bar and to release the channel entrance units for adjustment to correspond to the new matrix presented, but such adjustment will be delayed by the feeler plate 73 until all of the matrices of the previous form have been released from the bar. When this occurs, the mechanism will then operate to adjust the entrance frame and lock it in a new position according to the new form of matrix awaiting distribution.

Figure 9:
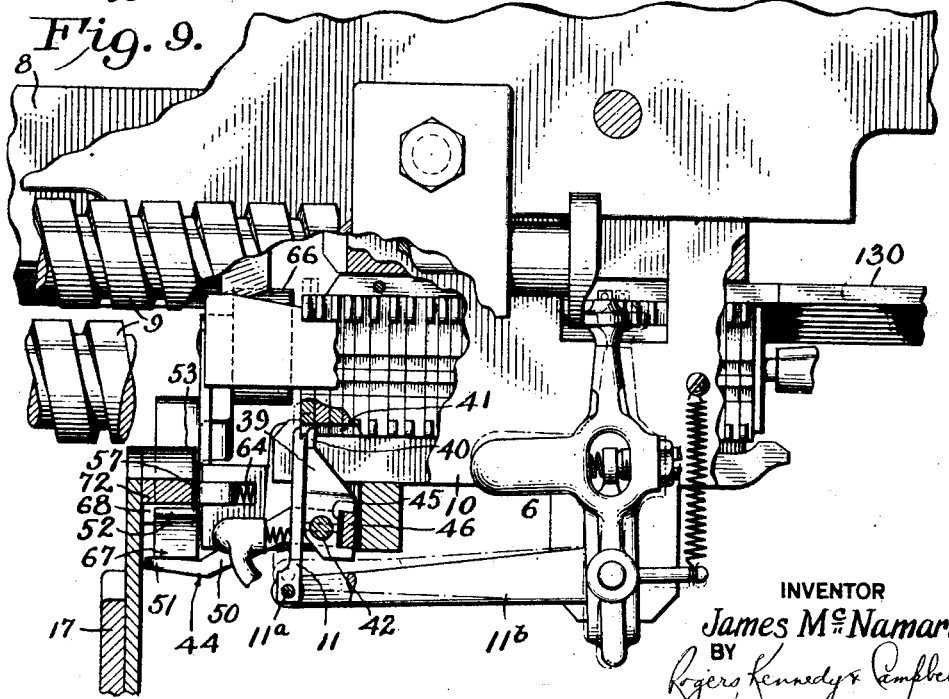
Fig. 9 is a similar view with the parts in a different position.
Figure 21:
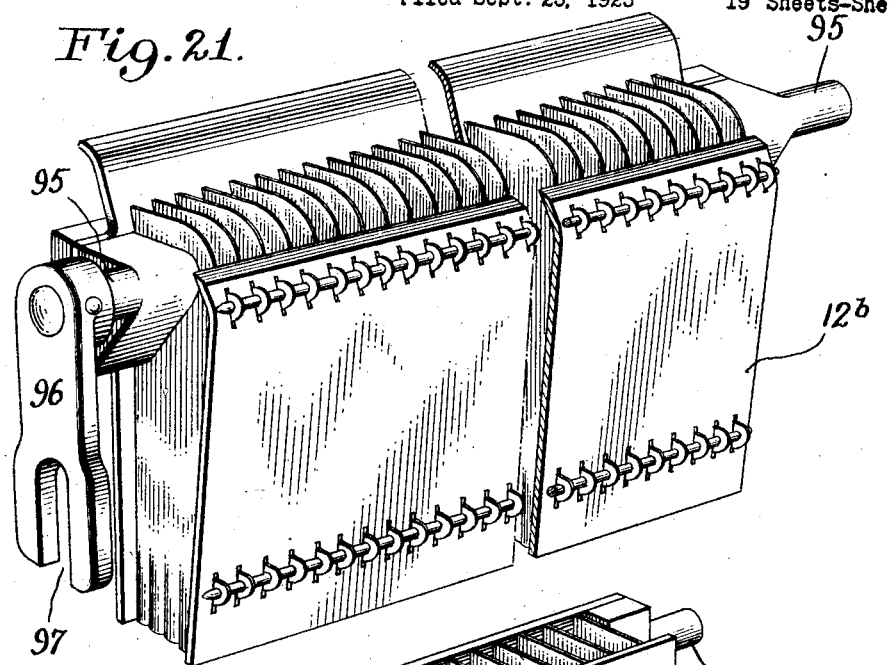
Fig. 21 is a detached perspective view of the swinging channel entrance unit shown in Fig. 17.
Figure 22:
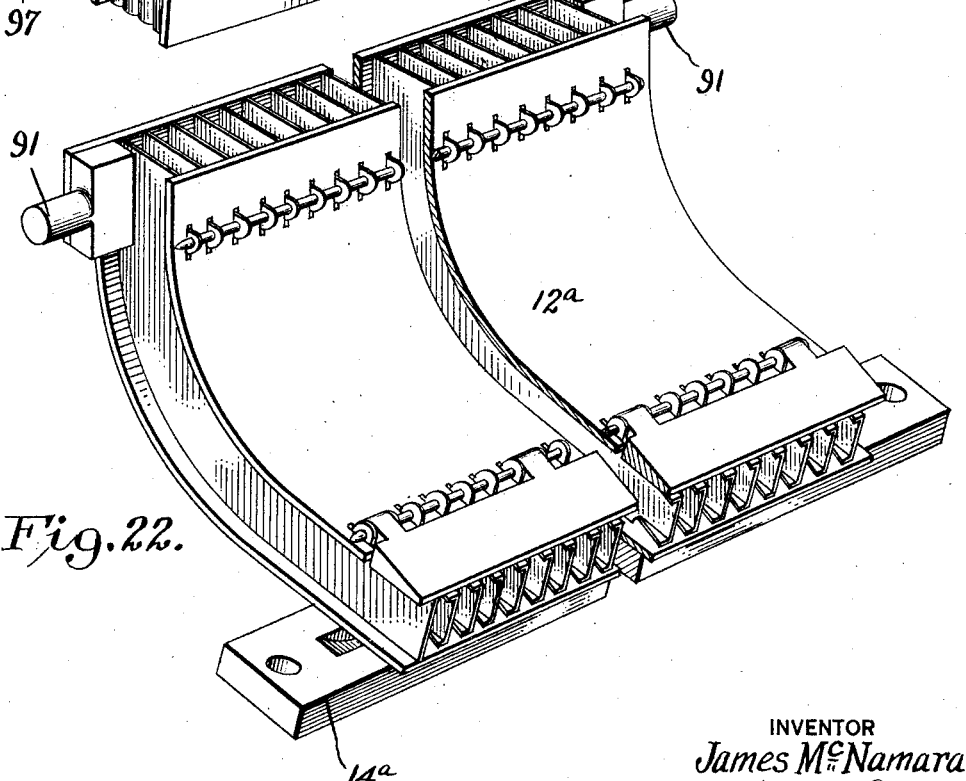
Fig. 22 is a perspective view of one of the stationary channel entrance units shown in Fig. 17.

It is believed that the operation of the various parts will have been understood from the foregoing description but a brief recapitulation may be helpful: Let it be assumed that matrices of a given form are being advanced through the distributor box and that the channel entrance units are in position to direct these matrices into their appropriate magazine, the feeler 39 being set with its projection 40 in register with the notches 41 of the matrices so as to allow them to pass and be fed to the distributor screws 9 by the lifting finger 11, as shown in Fig. 9. In this condition of the mechanism, the channel entrance frame 17 is held in its proper adjusted position by the locking lever 52 which latter is held in active position by the feeler finger 51 under the influence of the spring 48. So long as matrices of the same form are presented for distribution, no change in the condition of the parts will take place, although it will be remembered that the matrices while present on the distributor bar will act through the feeler plate 73, lever arms 78 and 84, and slotted post 86, to maintain the locking lever in active position. With the parts thus locked against movement and offering resistance to the endwise movement of the link 32 of the power devices, the crank pin 30 in the rotation of the pinion 29 will shift back and forth in the slot in the link as the latter is swung to and fro without moving the channel entrance frame.

When now a matrix of a different form, i. e., having a differently located notch 41, is presented to the feeler 39, the projection 40 thereon will be engaged by the lower edge of the advancing matrix, as shown in Figs. 8 and 10, and rock the feeler forwardly and render the lifting finger 11 inactive so that it will vibrate idly without acting on the matrix. This rocking of the feeler will also rock the finger 51 downwardly and disengage it from the locking lever 52 to permit the latter to drop to inactive position for the release of the channel entrance frame 17. Such releasing action, however, as just explained, cannot take place until all the matrices of the previous form have left the distributor bar, at which time the feeler plate 73 moves downwardly and to the left to depress the arm 84, which until then has supported the locking lever 52 in its raised or active position. Just as soon as the parts are thus released, no further resistance is offered to the endwise movement of the power operated link 32 and the friction washers 35 and 36 will couple it to the crank pin on the constantly operated pinion 29, causing the frame 17 to swing on its axis and adjust the channel entrance units. This swinging of the frame 17 will, through the action of the cam surfaces 53, 54, etc., on the elbow lever arm 57, shift the feeler 39 edgewise of the newly presented matrix until the projection 40 registers with the notch 41 in the matrix, whereupon the projection will be snapped into the notch by the action of the spring 48 and the feeler rocked back to vertical position, restoring to action the lifting finger 11 which immediately feeds the matrix to the distributor screws. As the feeler returns to vertical position, the finger 51 is swung upwardly and raises the locking lever 52 for engagement with the appropriate notch in the entrance frame 17, that is to say, that notch which will locate in operative relation to the distributor bar the particular channel entrance leading to the magazine to which the lifted matrix belongs. With the parts set in this new position, matrices of the same form may pass by the feeler and be lifted one at a time to the distributor screws, which will carry them onto and along the distributor bar, the leading matrix of the lot as it passes onto the bar acting beneath and lifting the feeler plate 73 to maintain the locking lever in active position and prevent the premature release of the entrance adjusting frame. So long as matrices whose notches register with the feeler projection 40 are presented for distribution, the parts will remain in the newly set position described, but immediately a matrix of a different form is presented, the parts will be put through the same sequence of operations in order to adjust the channel entrances so that the matrices of the latest form will be directed into their proper magazine.

Modification No. 1.

Referring now to the alternative embodiment illustrated in Figs. 15 to 22, it differs from the first embodiment just described mainly in regard to the form of the matrix directing means. In this embodiment there is employed a series of stationary channel entrance units $12^a$ whose lower ends are supported in constant communication with the upper ends of the respective magazines, and cooperating with the upper ends of these stationary units is an intermediate swinging channel entrance unit or throat $12^b$, pivotally supported on an axis 90 parallel with and close up to the distributor bar as shown in Fig. 17, in such manner that, while its upper receiving end will be maintained in position at all times to receive the matrices as they drop from the distributor bar, its lower discharge end may be adjusted into registration with the upper end of any selected one of the stationary units, see the dotted line showing in said figure. The swinging and stationary channel entrance units are shown in detail in Figs. 21 and 22, where it will be seen that each unit, as in the first instance, is made up of upper and lower side plates and intermediate partitions.

Each stationary unit $12^a$ has fixed to it, at its lower end and on its underside a cross bar $14^a$, and at its upper end and on opposite sides outwardly projecting pins 91. The several units, by means of these cross bars and pins, are mounted one above another in a supporting frame 92 (Fig. 15), consisting of two side members or arms $92^a$ pivoted at their lower ends, as at $92^b$, to the distributor brackets 20 on a horizontal axis, so that the frame can be swung downwardly and rearwardly to the dotted line position indicated, the cross bars $14^a$ being screwed at their ends to seats formed on the arms $92^a$, and the pins 91 being seated in open sockets 92ᶜ formed in the upper ends of said arms, see also Fig. 17. The supporting frame 92 is held in its normal upright position by means of a horizontal retractable locking pin 93 (Fig. 16) adapted to engage in a hole or recess formed in one of the arms 92ᵃ and mounted in a bracket 94 projecting rearwardly from the distributor bracket at that side of the machine.

The swinging channel entrance unit 12ᵇ is provided at its opposite ends and near the top with journal studs 95 mounted to turn in suitable bearings formed in the upper ends of the side arms of the supporting frame 92. One of the journal studs has a downwardly extending arm 96 formed at its lower free end with a slot 97, wherein engages a retractable pin 98 mounted in a bushing 99 carried by a sector plate 100 pivoted, as at 101, to the bracket 94 on a horizontal transverse axis. The sector plate 100 is provided with an operating arm 102 pivoted to the upper end of a link 103, whose lower end is pivoted to the rear arm of an elbow lever 104, the latter being pivoted at 105 to the magazine frame 16ᵃ and having its forward arm pivoted to the upper end of the power transmitting link 32 before discussed. As the parts are thus arranged, the endwise movement of the link 32 caused by the rotation of the driving pinion 29 as previously described, will swing the channel entrance unit 12ᵇ on its pivotal axis, whereby its discharge end will be adjusted into operative relation to one or another of the stationary channel entrance units 12ᵃ to direct the distributed matrices into their proper magazine.

Due to the pivotal mounting of the supporting frame 92 on the axis 92ᵇ, said frame with all the parts carried thereby, including the swinging as well as the stationary channel entrance units, may be swung downwardly to the dotted line position shown in Fig. 15, by first retracting the locking pin 93 to release the frame 92 and then retracting the locking pin 98 to release the swinging channel entrance unit 12ᵇ from the sector plate 100, such lowered position of the channel entrance units exposing the upper receiving ends of the magazines, and permitting access to the various parts for inspection, repairs, or removal.

The sector plate 100, like the swinging entrance supporting frame 17 of the first embodiment, serves also as a reciprocating member to operate the feeler 39 of the matrix controlled mechanism. Thus, as shown best in Figs. 18 and 20, the sector plate is provided along its peripheral edge with a series of stepped cam surfaces 53ᵃ, 54ᵃ, 55ᵃ and 56ᵃ, which in the swinging movements of the entrance unit 12ᵇ engage the elbow lever 58 and, through the medium of said lever and the rock shaft 42, shift the feeler 39 edgewise of the matrices, in the same way as first described. The sector plate 100 is held in different positions, with the discharge end of the swinging channel entrance unit 12ᵇ in operative relation to one or another of the stationary channel entrance units 12ᵃ, by means of the aforementioned locking lever 52, adapted to cooperate with notches 68ᵃ, 69ᵃ, 70ᵃ, and 71ᵃ formed in a flange 72ᵃ at the upper edge of the plate, see Figs. 18 and 20. The locking lever is operated precisely as before, being controlled on the one hand (through the feeler 39) by the matrices while passing through the distributor box 10 and on the other hand (through the feeler plate 73) by the matrices while traversing the distributor bar 8. In other words, when matrices of a given form are presented for distribution, the locking lever will act to set the adjustable entrance unit 12ᵇ in registration with the stationary unit 12ᵃ leading to the corresponding magazine and will maintain the parts in such condition until matrices of another form are presented for distribution, at which time it will set the adjustable unit in another position to correspond with the newly presented matrices but not until all of the matrices of the previous form have been delivered from the distributor bar.

*Modification No. 2.*

Figure 23:
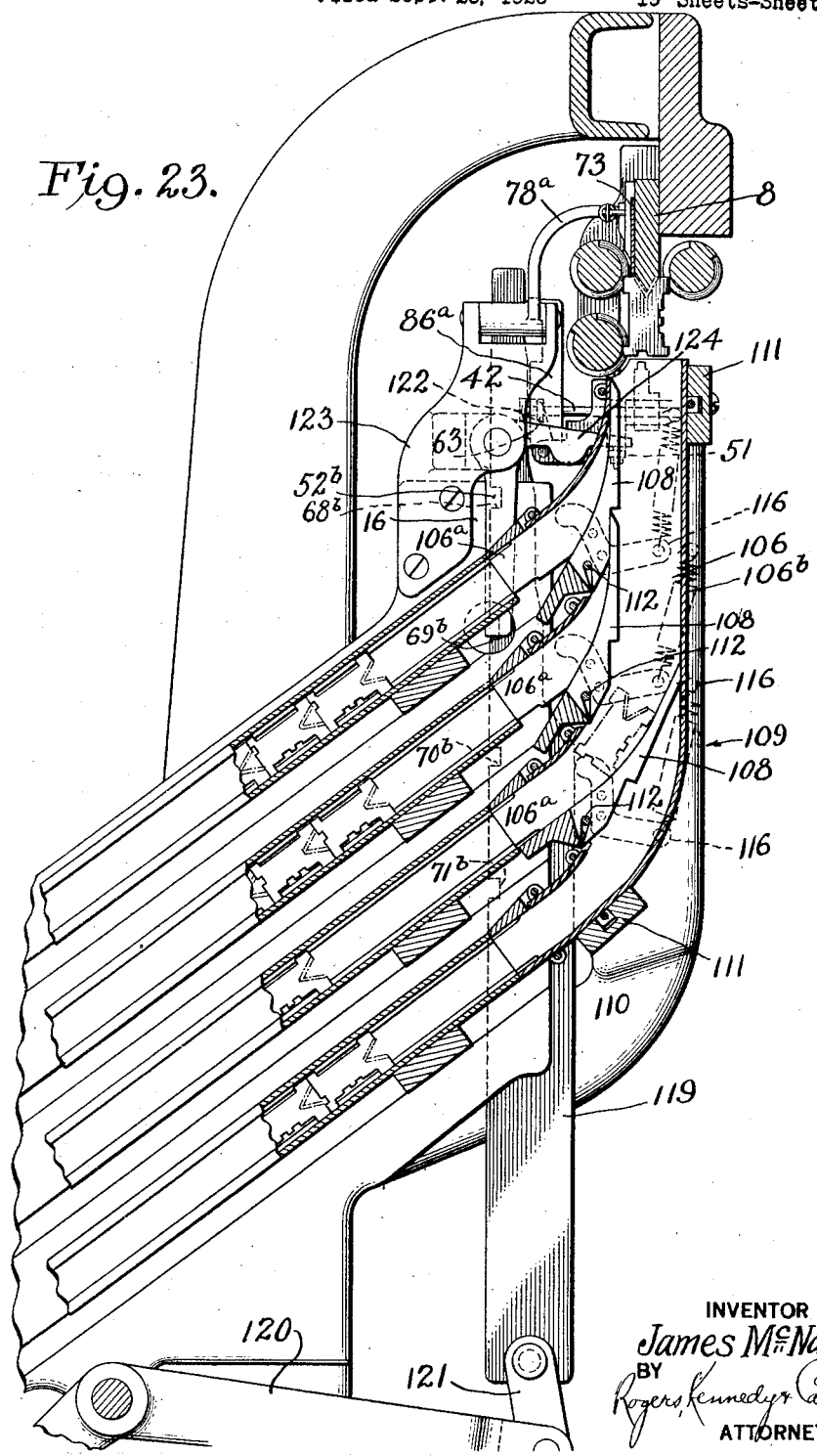
Fig. 23 is a view similar to Figs. 4 and 17 and showing a second alternative form of the invention.
Figure 24:
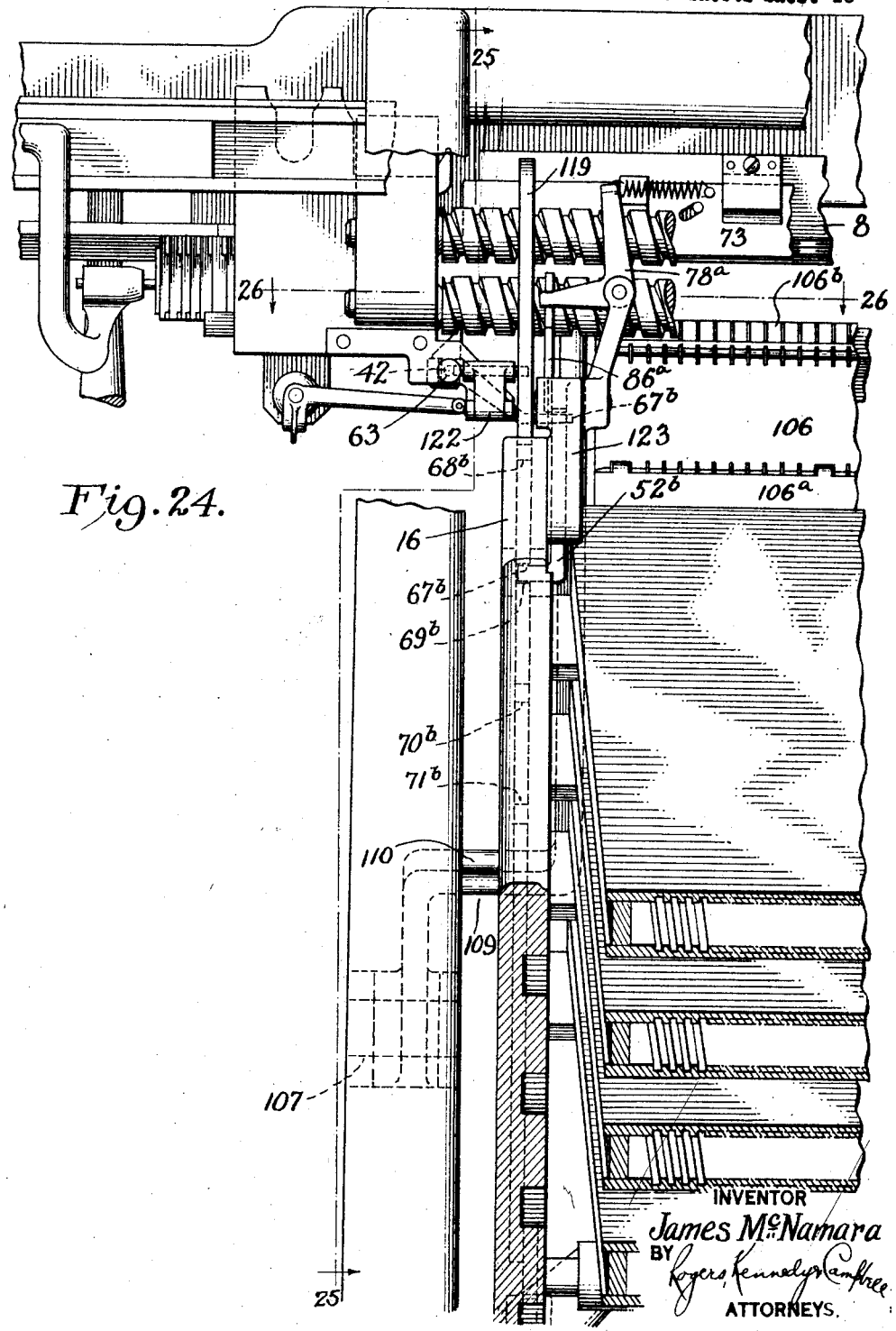
Fig. 24 is a front elevation similar to Fig. 2, but showing of course this second alternative form of the invention.
Figure 25:
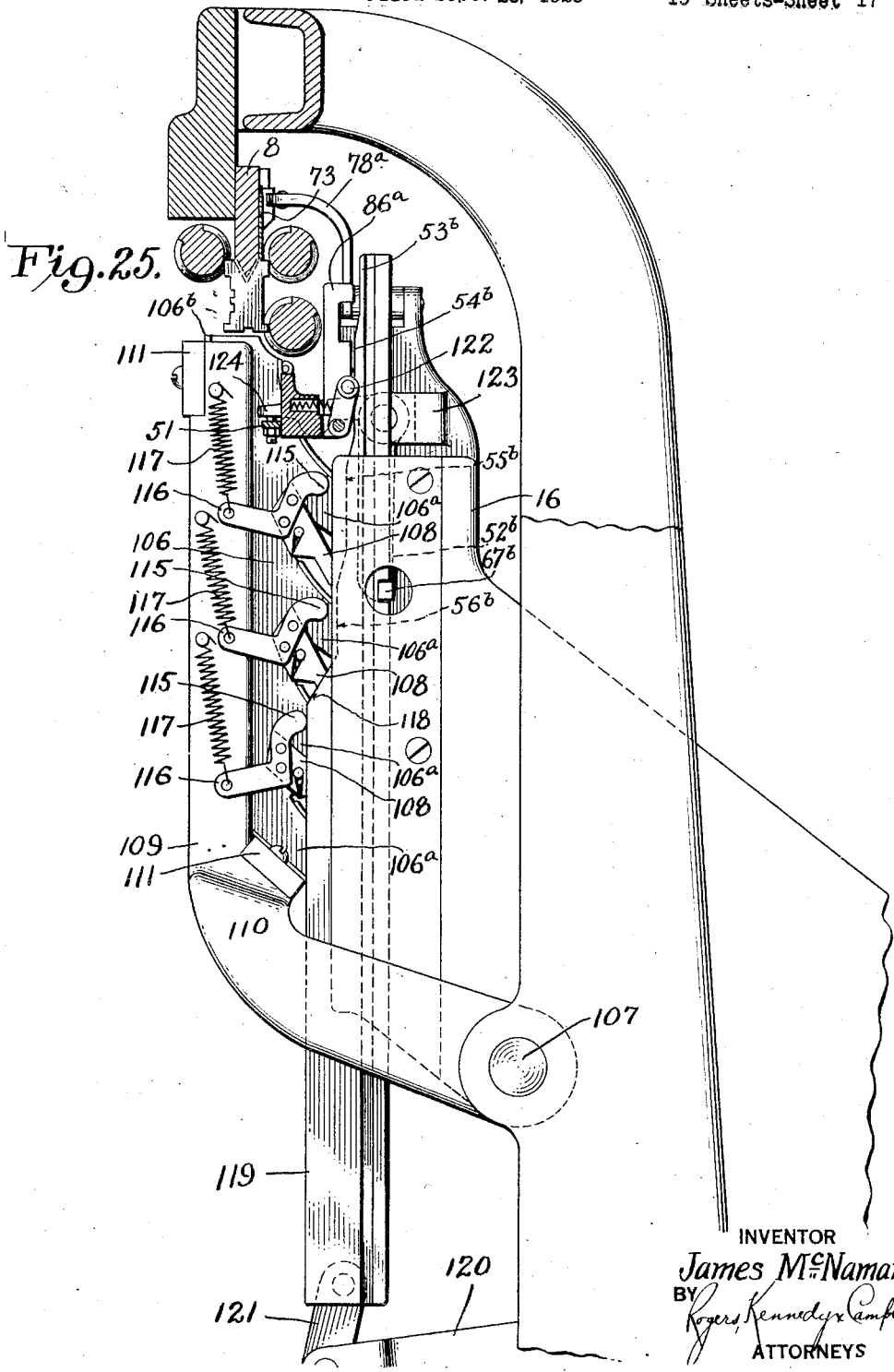
Fig. 25 is a sectional elevation on the line 25—25 of Fig. 24.
Figure 26:
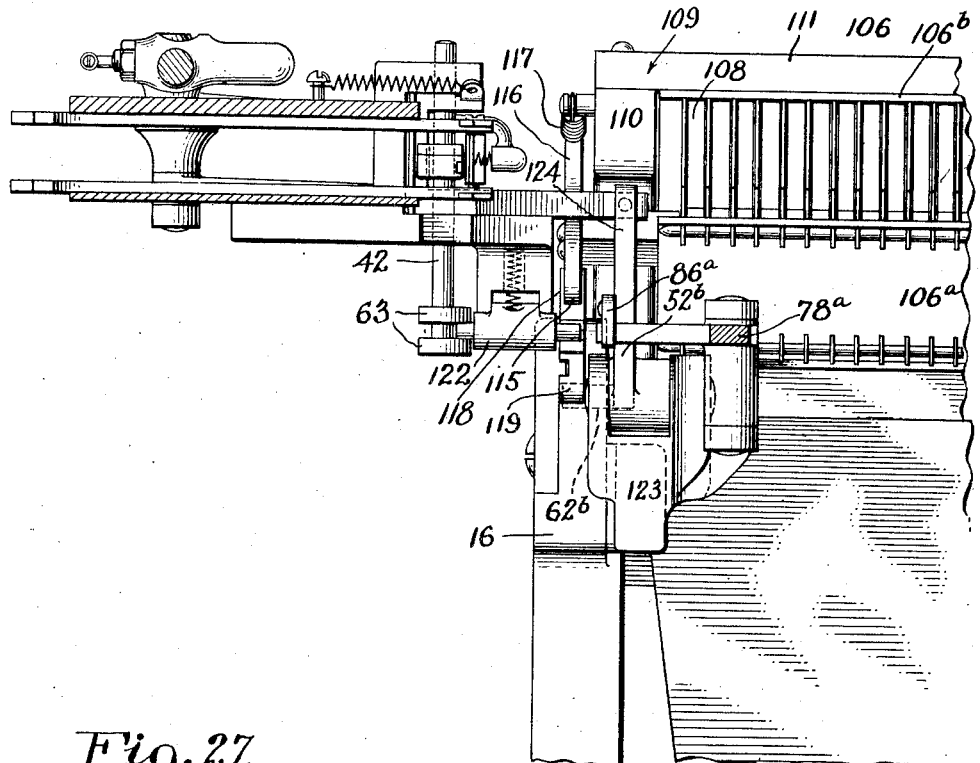
Fig. 26 is a sectional plan view on the line 26—26 of Fig. 24.
Figure 27:
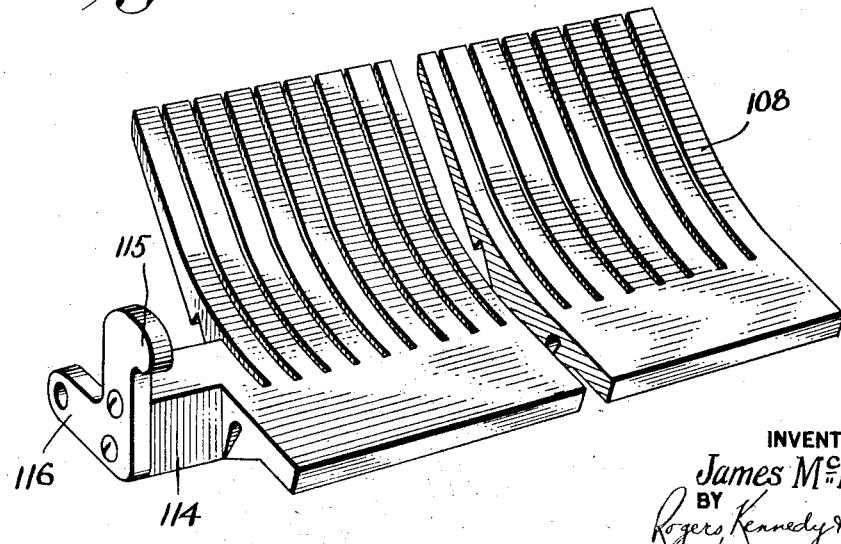
Fig. 27 is a perspective view of one of the switch plates of the channel entrance structure.

The alternative embodiment illustrated in Figs. 23 to 29 also differs from the first embodiment mainly in regard to the form of the matrix directing means. In this instance, said means comprise an upright channel entrance 106 which receives the matrices as they drop from the distributor bar 8, and a series of branch portions 106ᵃ which lead from the entrance proper and communicate with the upper ends of the respective magazines, as best shown in Figs. 23 and 28. Suitable switches 108 (one for each magazine except the lowermost one 5) are arranged within the channel entrance to deflect the matrices therefrom into one or another of the magazines according to form or font. The entrance parts are supported in a frame 109 consisting of two side bars or arms 110 and upper and lower connecting cross bars 111, the side frame arms 110 being extended downwardly and pivoted at their lower ends, as at 107 (Fig. 25), to the distributor brackets so as to permit the supporting frame to be swung rearwardly and downwardly in order to expose the magazines and the channel entrance unit for inspection, repairs, or removal. As best shown in Fig. 28, the entrance and its branch portions are provided with the usual partitions, which, when the supporting frame is in its normal upright position, align with the partitions in the magazines, the several switches being slotted as shown in Fig. 27 to straddle the partitions. The switches are arranged one above another and are pivoted near their lower ends upon rods 112 fixed to the entrance structure, see Fig. 23. As a result of this construction, when the switches are swung to a vertical position they will extend across all the branch entrances (except the one leading to the bottom magazine), each lower switch overlapping and seating against the next switch above and the three forming in effect the front wall of the channel entrance proper, which front wall in connection with the rear wall 106$^b$ will form an uninterrupted guiding passage leading from the distributor to the bottom magazine 5. When, however, one of the switches is swung downwardly on its pivotal axis, it opens the associated branch portion and extends across the channel entrance proper into engagement with the rear wall thereof, in which position it acts to direct the matrices descending the channel entrance through its open branch portion and into the corresponding magazine. These switches are operated by the power devices before described and are governed in their adjustment by matrix controlled mechanism substantially similar to that described in connection with the two preceding embodiments, as will now appear.

Each of the switches 108 is provided at one end adjacent its lower edge, with a lug 114 formed with a finger 115 and with an arm 116. The arms 116 are connected to springs 117 anchored to a side arm of the supporting frame 109, and which act to rock the plates upwardly and hold them yieldingly in closed position. The fingers 115 are arranged to be engaged by a cam 118 on the rear edge of a slide 119 movable vertically in a guiding slot formed in the magazine frame 16, the engagement of the cam with the fingers, as the slide is moved upwardly, acting to swing the switches downwardly to open position in succession, beginning with the lower switch. From this construction, it will be seen that one or another of the magazines will be placed in communication with the channel entrance proper, according to the extent of the upward movement of the cam slide. Such movement of the slide is effected by means of an elbow lever 120 (Fig. 23) pivoted to the magazine frame and having its rear arm connected to the slide by a link 121, and having its rear arm pivoted to the upper end of the power transmitting link 32, so that the endwise movements of this link, caused by the rotation of the driving pinion 29, will be imparted to the slide.

The slide 119, like channel entrance frame 17 of the first embodiment and the sector plate 100 of the second embodiment, also serves as a reciprocating member to operate the feeler 39 of the matrix controlled mechanism. To adapt the slide to perform this function, it is formed above the cam 118 (Fig. 25) with four stepped cam surfaces 53$^b$, 54$^b$, 55$^b$, and 56$^b$ cooperating with a spring actuated pivoted lever 122 engaged with the grooved collar 63 of the rock shaft 42. Hence, when the slide is moved upwardly to adjust the switches 108, the feeler 39 will be shifted edgewise of the matrices in the manner and for the purpose above described in connection with the other two embodiments of the invention.

The slide 119 is locked in its different adjusted positions, with one or the other of the switches in operation, by means of a locking lever 52$^b$ (Fig. 29) pivoted to a bracket 123 and formed with a nose 67$^b$ adapted to engage in the selected one of a series of notches 68$^b$, 69$^b$, 70$^b$ and 71$^b$ formed in the forward edge of the slide. This locking lever has fixed to it an arm 124 arranged to be engaged by the finger 51 of the feeder in adapting the latter to exercise its control of the lever in the same way as in the case of the locking lever 52 before described. The arm 124 carries an upstanding post 86$^a$, similar to the post 86 in the preceding embodiments, cooperating with a two-armed lever 78$^a$ (like the lever 78) actuated by the feeler plate 73 on the distributor bar. It will now be seen that when matrices of a given form are presented for distribution, the locking lever 52$^b$ will act to set the switches 108 so as to direct the matrices into the corresponding magazine and will maintain the parts in such condition until matrices of another form are presented for distribution, at which time it will set the switches in another position to correspond to the newly presented matrices but not until all of the matrices of the previous form have been released from the distributor bar.

The invention is not, of course, limited to any particular embodiment, as various changes and modifications may be resorted to in carrying the invention into effect without departing from the main principles involved and without sacrificing its chief advantages.

Having thus described my invention, what I claim and desire to secure by Letters Patent of the United States is, as follows:

1. In a typographical machine equipped with matrices of different forms, the combination of a plurality of matrix magazines, a single distributor bar formed with a series of matrix releasing combinations at different points in its length, adjustable means for directing the distributed matrices into one or another of the magazines, means operated independently of the matrices to effect the adjustment of said directing means, and mechanism controlled by the matrices prior to their delivery to the distributor bar for governing the adjustment of said directing means.

2. In a typographical machine equipped with matrices of different forms, the combination of a plurality of matrix magazines, a single distributor bar formed with a series of matrix releasing combinations at different points in its length, adjustable means for directing the distributed matrices into one or another of the magazines, means operated independently of the matrices to effect the adjustment of said directing means, and mechanism controlled by the matrices while still engaged with the distributor bar for governing the adjustment of said directing means.

3. In a typographical machine equipped with matrices of different forms, the combination of a plurality of matrix magazines, a single distributor bar formed with a series of matrix releasing combinations at different points in its length, adjustable means for directing the distributed matrices into one or another of the magazines, means operated independently of the matrices to effect the adjustment of said directing means, and mechanism controlled by the matrices prior to their delivery to the distributor bar and while still engaged with the distributor bar for governing the adjustment of said directing means.

4. In a typographical machine equipped with matrices of different forms, the combination of a plurality of matrix magazines, a single distributor bar formed with a series of matrix releasing combinations at different points in its length, adjustable means for directing the distributed matrices into one or another of the magazines, means to effect the adjustment of the matrix directing means, and mechanism for governing the adjustment of said directing means, said mechanism including a locking device for holding the directing means in an adjusted position, and means actuated by the matrices prior to their delivery to the distributor bar for unlocking the directing means to permit it to be adjusted to another position and then locking it in its new position.

5. In a typographical machine equipped with matrices of different forms, the combination of a plurality of matrix magazines, a single distributor bar formed with a series of matrix releasing combinations at different points in its length, adjustable means for directing the distributed matrices into one or another of the magazines, means to effect the adjustment of the matrix directing means, and mechanism for governing the adjustment of said directing means, said mechanism including a locking device for holding the directing means in an adjusted position, and means controlled by the matrices while still engaged with the distributor bar for unlocking the directing means to permit it to be adjusted to another position.

6. In a typographical machine equipped with matrices of different forms, the combination of a plurality of matrix magazines, a single distributor, adjustable means for directing the distributed matrices into one or another of the magazines, means to effect the adjustment of the matrix directing means, and mechanism for governing the adjustment of said directing means, said mechanism including a locking device for holding the directing means in an adjusted position, means controlled by the matrices prior to their delivery to the distributor for unlocking the directing means to permit it to be adjusted to another position and then locking it in its new position, and means controlled by the matrices while undergoing distribution for preventing the premature unlocking of the directing means.

7. In a typographical machine equipped with matrices of different forms, the combination of a plurality of matrix magazines, a single distributor means for presenting the matrices facewise to the distributor, adjustable means for directing the distributed matrices into one or another of the magazines, means to effect the adjustment of the matrix directing means, and matrix controlled mechanism for governing the adjustment of said directing means, said mechanism including a feeler member movable across the path of travel of the matrices as they are presented facewise to the distributor to detect those of different forms.

8. In a typographical machine equipped with matrices of different forms, the combination of a plurality of matrix magazines, a single distributor means for presenting the matrices facewise to the distributor, adjustable means for directing the distributed matrices into one or another of the magazines, means to effect the adjustment of the matrix directing means, and matrix controlled mechanism for governing the adjustment of said directing means, said mechanism including a feeler member arranged in the path of travel of the matrices as they are presented facewise to the distributor and movable edgewise thereof to detect those of different forms.

9. In a typographical machine equipped with matrices of different forms, the combination of a plurality of matrix magazines, a single distributor, adjustable means for directing the distributed matrices into one or another of the magazines, means to effect the adjustment of the matrix directing means, and matrix controlled mechanism for governing the adjustment of the directing means, said mechanism including a feeler member arranged in the path of travel of the matrices and movable both edgewise and facewise thereof in governing the adjustment of the matrix directing means.

10. In a typographical machine equipped with matrices formed with differently located notches in their lower edges, the combination of a plurality of matrix magazines, a single distributor means for presenting the matrices facewise to the distributor, adjustable means for directing the distributed matrices into one or another of the magazines, means to effect the adjustment of said directing means, and matrix controlled mechanism for governing the adjustment of the matrix directing means, said mechanism including a feeler member movable edgewise of the matrices as they are presented facewise to the distributor to register with the notches therein.

11. In a typographical machine equipped with matrices formed with differently located notches in their lower edges, the combination of a plurality of matrix magazines, a single distributor, adjustable means for directing the distributed matrices into one or another of the magazines, means to effect the adjustment of said directing means, and matrix controlled mechanism for governing the adjustment of the matrix directing means, said mechanism including a feeler member cooperating with the matrices prior to their delivery to the distributor and movable edgewise thereof to register with the notches therein.

12. In a typographical machine equipped with matrices of different forms, the combination of a plurality of matrix magazines, a single distributor, means for presenting the matrices facewise to the distributor, adjustable means for directing the distributed matrices into one or another of the magazines, means to effect the adjustment of said directing means, mechanism, including a feeler member movable across the path of travel of the matrices as they are presented facewise to the distributor, for governing the adjustment of the matrix directing means, and means actuated by the adjustment of said directing means for moving said feeler member.

13. In a typographical machine equipped with matrices of different forms, the combination of a plurality of matrix magazines, a single distributor including a distributor bar, adjustable means for directing the distributed matrices into one or another of the magazines, means to effect the adjustment of said directing means, a feeler member cooperating with the matrices prior to their delivery to the distributor for governing the adjustment of the matrix directing means, a locking device controlled by the feeler member for holding the directing means in its adjusted position, and a feeler plate movably mounted on the distributor bar and adapted when engaged by the matrices thereon to prevent the release of the locking device by the feeler member.

14. In a typographical machine equipped with matrices of different forms, the combination of a plurality of matrix magazines, a single distributor, adjustable means for directing the distributed matrices into one or another of the magazines including a reciprocating member, means to effect the adjustment of said directing means, and mechanism for governing the adjustment of the matrix directing means, said mechanism including a movable feeler member arranged in the path of travel of the matrices and operated by said reciprocating member.

15. In a typographical machine equipped with matrices of different forms, the combination of a plurality of matrix magazines, a single distributor, adjustable means for directing the distributed matrices into one or another of the magazines including a reciprocating member provided with cams, means to effect the adjustment of said directing means, and mechanism for governing the adjustment of the matrix directing means, said mechanism including a feeler member arranged in the matrix path and moved to different positions by said cams.

16. In a typographical machine equipped with matrices of different forms, the combination of a plurality of matrix magazines, a single distributor, adjustable means for directing the distributed matrices into one or another of the magazines and including a reciprocating member, a constantly operated power device for effecting the adjustment of the matrix directing means, a power transmitting member connected with the reciprocating member and frictionally engaged with the power device to permit operation of the latter without affecting the reciprocating member, and matrix controlled mechanism for governing the adjustment of the matrix directing means, said mechanism including a locking device for holding the reciprocating member in an adjusted position, and means for releasing said reciprocating member to permit it to be adjusted to another position and then locking it in its new position.

17. In a typographical machine equipped with matrices of different forms, the combination of a plurality of magazines, a single distributor, adjustable means for directing the distributed matrices into one or another of the magazines, a constantly operated power device for effecting the adjustment of the matrix adjusting means, a connection between said power device and directing means frictionally engaged with one of said parts, and matrix controlled mechanism for governing the adjustment of the matrix directing means, said mechanism including a locking device for holding the directing means in an adjusted position, and means for releasing the directing means to permit it to be adjusted by the power device to another position and then locking the same in its new position.

18. In a typographical machine equipped with matrices of different forms, the combination of a plurality of matrix magazines, a single distributor, adjustable means for directing the distributed matrices into one or another of the magazines, including a reciprocating member, a constantly operated power device for effecting the adjustment of the matrix directing means, a member for transmitting power from the power device to the reciprocating member, said member being connected to one of said parts and frictionally engaged with the other, and matrix controlled mechanism for governing the adjustment of the matrix directing means, said mechanism including a locking device for holding the reciprocating member in an adjusted position, and means for releasing the reciprocating member to permit it to be adjusted by the power device to another position and then locking the same in its new position.

19. In a typographical machine equipped with matrices of different forms, the combination of a plurality of matrix magazines, a single distributor, a vibrating finger for feeding the matrices to the distributor, means for presenting the matrices to the action of said finger, adjustable means for directing the distributed matrices into one or another of the magazines, means to effect the adjustment of said directing means, and matrix controlled mechanism for governing the adjustment of the matrix directing means, said mechanism including a feeler member arranged in front of the vibrating finger in the path of the presented matrices and adapted to be moved by a matrix differing in form from those undergoing distribution and acting when thus moved to render the vibrating finger inactive.

20. In a typographical machine equipped with matrices of different forms, the combination of a plurality of matrix magazines, a single distributor, a distributor box through which the matrices are advanced toward the distributor, a lifting finger adapted to engage the leading matrix and feed the same to the distributor, said finger being movable to an inactive position free of the leading matrix, adjustable means for directing the distributed matrices into one or another of the magazines, means to effect the adjustment of said directing means, and matrix controlled mechanism for governing the adjustment of the matrix directing means, said mechanism including a feeler member arranged in front of the lifting finger in the path of the advancing matrices and adapted to be engaged by a matrix differing in form from those undergoing distribution and move the lifting finger to an inactive position.

21. In a typographical machine equipped with matrices formed with differently located notches in their edges, the combination of a plurality of matrix magazines, a single distributor, means for presenting the matrices for distribution, a device for feeding the presented matrices to the distributor, adjustable means for directing the distributed matrices into one or another of the magazines, means to effect the adjustment of said directing means, means for locking the directing means in a set position, means for preventing the release of the directing means until all the matrices undergoing distribution have been delivered from the distributor, a feeler member arranged in the path of the presented matrices and adapted to permit those matrices to pass to the distributor whose notches register with the feeler member, but adapted to be engaged and operated by a matrix whose notch is out of register with the feeler member, means whereby such operation of the feeler member will render the feeding device inactive, means also controlled by such operation of the feeler member to disengage the aforesaid locking means so that the matrix directing means may be adjusted to another position, means operated during the adjustment of the matrix directing means for moving the feeler member across the path of the leading matrix to cause it to register with the notch therein, and means acting when such registration takes place to move the feeler member and lock the matrix directing means in its new position and restore the action of the feeding device.

22. In a typographical machine equipped with matrices of different forms, the combination of a plurality of matrix magazines, a single distributor, adjustable means for directing the distributed matrices into one or another of the magazines, including a reciprocating member provided with locking notches, means to effect the adjustment of said directing means, and mechanism for governing the adjustment of the matrix directing means, said mechanism including a movable locking arm adapted to engage in said notches and hold the reciprocating member in different positions according to the form of the matrices undergoing distribution, a feeler plate movably mounted on the distributor and adapted to be engaged by a matrix present in the distributor, operative connections between said plate and locking arm adapted when the plate is engaged by a matrix, to hold the locking arm engaged in a locking notch of the reciprocating member and acting when all of the matrices have left the distributor to disengage the locking arm from said locking notch, a feeler member arranged in the path of the matrices prior to their delivery to the distributor, and an arm on said feeler member adapted to engage the locking arm and hold the same in locking position, said feeler member being adapted to be engaged and moved by a matrix differing in form from those undergoing distribution and operating by such movement to release said locking arm.

23. In a typographical machine, the combination of a plurality of matrix magazines, a distributor, a plurality of channel entrances pivotally mounted independently of the magazines but with their lower ends in constant communication with the upper ends of the magazines, a shiftable supporting frame in which said channel entrances are mounted, and means for shifting said frame to adjust the upper end of any selected channel entrance into operative relation to the distributor.

24. In a typographical machine, the combination of a frame provided with sets of opposed bearing sockets, a plurality of matrix magazines mounted in said frame with their upper ends terminating adjacent said sockets, a distributor, a plurality of channel entrances having fulcruming heads at their lower ends rockably mounted in said sockets, whereby said channel entrances are pivotally arranged with their lower ends in constant communication with the upper ends of the magazines, a shiftable supporting frame in which the channel entrances are mounted, and means for shifting said frame to adjust the upper end of any selected channel entrance into operative relation to the distributor.

25. In a typographical machine, the combination of a frame provided with sets of opposed bearing sockets open at the rear, a plurality of magazines mounted in said frame with their upper ends terminating adjacent said sockets, a distributor, a plurality of channel entrances, a shiftable supporting frame in which said channel entrances are mounted and from which they are removable independently of each other, said channel entrances being provided at their lower ends with fulcruming heads rockably mounted in said bearing sockets and removable through the open ends thereof independently of each other, and means for shifting the supporting frame to adjust the upper end of any selected channel entrance into operative relation to the distributor.

26. Typographical distributing mechanism for handling matrices of different forms including, in combination, adjustable means for directing the matrices to different points according to form, means operated independently of the matrices to effect the adjustment of said directing means, and matrix controlled mechanism for governing the action of said adjusting means.

27. Typographical distributing mechanism for handling matrices of different forms and adapted to release said matrices at a common point, including, in combination, adjustable means for directing the released matrices to different points according to form, means to effect the adjustment of said directing means, and matrix controlled mechanism for governing the action of said adjusting means, said mechanism including a movable feeler member cooperating with the matrices prior to their delivery to the distributing mechanism.

28. In a typographical machine equipped with matrices of different forms, the combination of a plurality of matrix magazines, a single distributor, a plurality of intermediate channel entrances pivotally mounted with their lower ends in constant communication with the upper ends of the respective magazines, means for adjusting the channel entrances to bring the upper end of any selected one into operative relation to the distributor, and means controlled by the matrices prior to their delivery to the distributor for governing the action of said entrance adjusting means.

29. In a typographical machine equipped with matrices of different forms, the combination of a plurality of matrix magazines, a single distributor bar formed with a series of matrix releasing combinations at different points in its length, a plurality of intermediate channel entrances pivotally mounted with their lower ends in constant communication with the upper ends of the respective magazines, means for adjusting the channel entrances to bring the upper end of any selected one into operative relation to the distributor, and means controlled by the matrices while still engaged with the distributor bar for governing the action of said entrance adjusting means.

30. In a typographical machine equipped with matrices of different forms, the combination of a plurality of matrix magazines, a single distributor, a plurality of intermediate channel entrances pivotally mounted with their lower ends in constant communication with the upper ends of the respective magazines, means for adjusting the channel entrances to bring the upper end of any selected one into operative relation to the distributor, and means controlled by the matrices prior to their delivery to the distributor and while undergoing distribution, for governing the action of said entrance adjusting means.

31. In a typographical machine equipped with matrices of different forms, the combination of a plurality of matrix magazines, a single distributor, a plurality of intermediate channel entrances pivotally mounted with their lower ends in constant communication with the upper ends of the respective magazines, means for adjusting the channel entrances to bring the upper end of any selected one into operative relation to the distributor, and mechanism for governing the action of said entrance adjusting means, the said mechanism including a locking device for holding the entrances in their different adjusted positions, and means for engaging and disengaging said locking device under the control of the matrices.

32. In a typographical machine equipped with matrices of different forms, the combination of a plurality of matrix magazines, a single distributor, a plurality of intermediate channel entrances pivotally mounted with their lower ends in constant communication with the upper ends of the respective magazines, means for adjusting the channel entrances to bring the upper end of any selected one into operative relation to the distributor, and mechanism for governing the action of said entrance adjusting means, the said mechanism including a locking device for holding the entrances in adjusted position, and means actuated by the matrices prior to their delivery to the distributor for unlocking the entrances to permit them to be adjusted to another position and then locking them in their new position.

33. In a typographical machine equipped with matrices of different forms, the combination of a plurality of matrix magazines, a single distributor, a plurality of intermediate channel entrances pivotally mounted with their lower ends in constant communication with the upper ends of the respective magazines, means for adjusting the channel entrances to bring the upper end of any selected one into operative relation to the distributor, and mechanism for governing the action of said entrance adjusting means, the said mechanism including a locking device for holding the entrances in adjusted position, means actuated by the matrices prior to their delivery to the distributor for unlocking the entrances to permit them to be adjusted to another position and then locking them in their new position, and means controlled by the matrices while undergoing distribution to prevent the premature unlocking of the entrances.

34. In a typographical machine equipped with matrices of different forms, the combination of a plurality of matrix magazines, a single distributor, means for presenting the matrices facewise to the distributor, a plurality of intermediate channel entrances pivotally mounted with their lower ends in constant communication with the upper ends of the respective magazines, means for adjusting the channel entrances to bring the upper ends of any selected one into operative relation to the distributor, and mechanism for governing the action of said entrance adjusting means, said mechanism including a matrix actuated feeler member movable across the path of the matrices as they are presented facewise to the distributor to cooperate with those of different forms, means for effecting such movement of the feeler member during the adjustment of the channel entrances, and means controlled by the feeler member for locating the entrances in their different adjusted positions.

35. In a typographical machine equipped with matrices formed with differently located notches in their edges, the combination of a plurality of matrix magazines, a single distributor, means for presenting the matrices for distribution, a device for feeding the presented matrices to the distributor, a plurality of channel entrances pivotally mounted with their lower ends in constant communication with the upper ends of the respective magazines, means for adjusting the channel entrances to bring the upper end of any selected one into operative relation to the distributor, means for locking the channel entrances in a set position, means for preventing the release of the channel entrances until all of the matrices undergoing distribution have been delivered from the distributor, a feeler member arranged in the path of the presented matrices and adapted to permit those matrices to pass to the distributor whose notches register with the feeler member but adapted to be engaged and operated by a matrix whose notch is out of register with the feeler member, means whereby such operation of the feeler member will render the feeding device inactive, means also controlled by such operation of the feeler to disengage the aforesaid locking means so that the channel entrances may be adjusted to another position, means operated during the adjustment of the channel entrances for moving the feeler member across the path of the leading matrix to cause it to register with a notch therein, and means acting when such registration takes place to move the feeler member and lock the channel entrances in their new position and restore the action of the feeding device.

36. In a typographical machine equipped with matrices of different forms, the combination of a plurality of matrix magazines, a single distributor, a plurality of intermediate channel entrances pivotally mounted with their lower ends in constant communication with the upper ends of the respective magazines, a constantly operated power device frictionally connected to the channel entrances for adjusting them to bring the upper end of any selected one into operative relation to the distributor, and locking means for holding the channel entrances in their different adjusted positions.

37. In a typographical machine equipped with matrices of different forms, the combination of a plurality of matrix magazines, a single distributor, a plurality of intermediate channel entrances pivotally mounted with their lower ends in constant communication with the upper ends of the respective magazines, a constantly operated power device frictionally connected to the channel entrances for adjusting them to bring the upper end of any selected one into operative relation to the distributor, and matrix controlled locking means for holding the channel entrances in their different adjusted positions.

In testimony whereof, I have affixed my signature hereto.

JAMES G. McNAMARA.